United States Patent [19]
Yamamoto et al.

[11] Patent Number: 6,032,263
[45] Date of Patent: *Feb. 29, 2000

[54] PARITY STORAGE UNIT, IN A DISK ARRAY SYSTEM, FOR GENERATING UPDATED PARITY DATA FROM RECEIVED DATA RECORDS

[75] Inventors: Akira Yamamoto, Sagamihara, Japan; Toshihiko Tamiya, Cupertino, Calif.; Hisashi Takamatsu; Akira Kurano, both of Odawara, Japan; Hirofumi Inomata, Tokyo, Japan

[73] Assignee: Hitachi, Ltd., Tokyo, Japan

[*] Notice: This patent is subject to a terminal disclaimer.

[21] Appl. No.: 09/076,835

[22] Filed: May 13, 1998

Related U.S. Application Data

[63] Continuation of application No. 08/739,441, Oct. 29, 1996, Pat. No. 5,826,002, which is a continuation of application No. 07/931,923, Aug. 18, 1992, Pat. No. 5,734,812.

[30] Foreign Application Priority Data

Aug. 20, 1991 [JP] Japan ................................ 3-207808

[51] Int. Cl.[7] .................................................. G06F 11/08
[52] U.S. Cl. ................................................................ 714/6
[58] Field of Search .................... 395/182.04, 182.03, 395/182.05, 185.07, 185.05; 371/51.1; 714/758; 711/114

[56] References Cited

U.S. PATENT DOCUMENTS

| | | |
|---|---|---|
| 5,124,987 | 6/1992 | Milligan et al. . |
| 5,191,584 | 3/1993 | Anderson . |
| 5,210,860 | 5/1993 | Pfeffer et al. . |
| 5,255,270 | 10/1993 | Yanai et al. . |
| 5,263,145 | 11/1993 | Brady et al. . |
| 5,274,799 | 12/1993 | Brant et al. . |
| 5,289,418 | 2/1994 | Youngerth . |
| 5,301,297 | 4/1994 | Menon et al. . |
| 5,390,187 | 2/1995 | Stallmo ................................. 371/10.1 |
| 5,734,812 | 3/1998 | Yamamoto et al. ............... 395/182.04 |

FOREIGN PATENT DOCUMENTS

| | | |
|---|---|---|
| 55-157053 | 12/1980 | Japan . |
| 59-135563 | 8/1984 | Japan . |
| 60-114947 | 6/1985 | Japan . |
| 3-37746 | 6/1992 | Japan . |
| 2-37418 | 5/1993 | Japan . |

OTHER PUBLICATIONS

Patterson et al, "A Case for Redundant Arrays of Inexpensive Disks (RAID)", Department of Electrical Engineering and Computer Sciences, University of California, pp. 109–116.

*Primary Examiner*—Robert W. Beausoliel, Jr.
*Assistant Examiner*—Scott T. Baderman
*Attorney, Agent, or Firm*—Beall Law Offices

[57] ABSTRACT

A disk array stores data records and parity records. The data records are transferred to the disk array through a control unit that is connected to a host processor. The disk array is part of a disk unit having a processor for generating parity records from information sent by the control unit to the disk unit. The parity record is generated and stored in the disk unit to reduce the number of data transfer operations between the control unit and the disk unit for storage systems using disk array disk units.

3 Claims, 25 Drawing Sheets

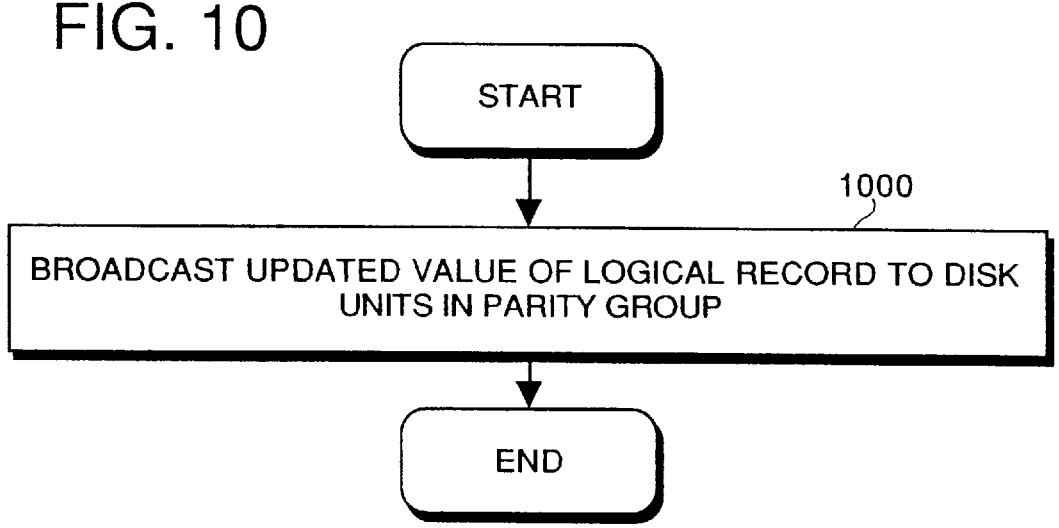
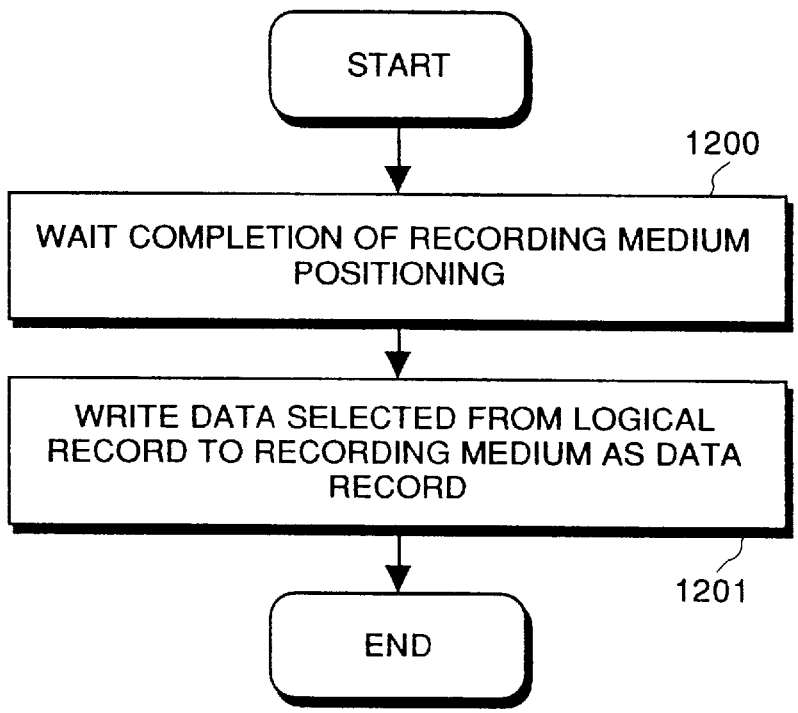

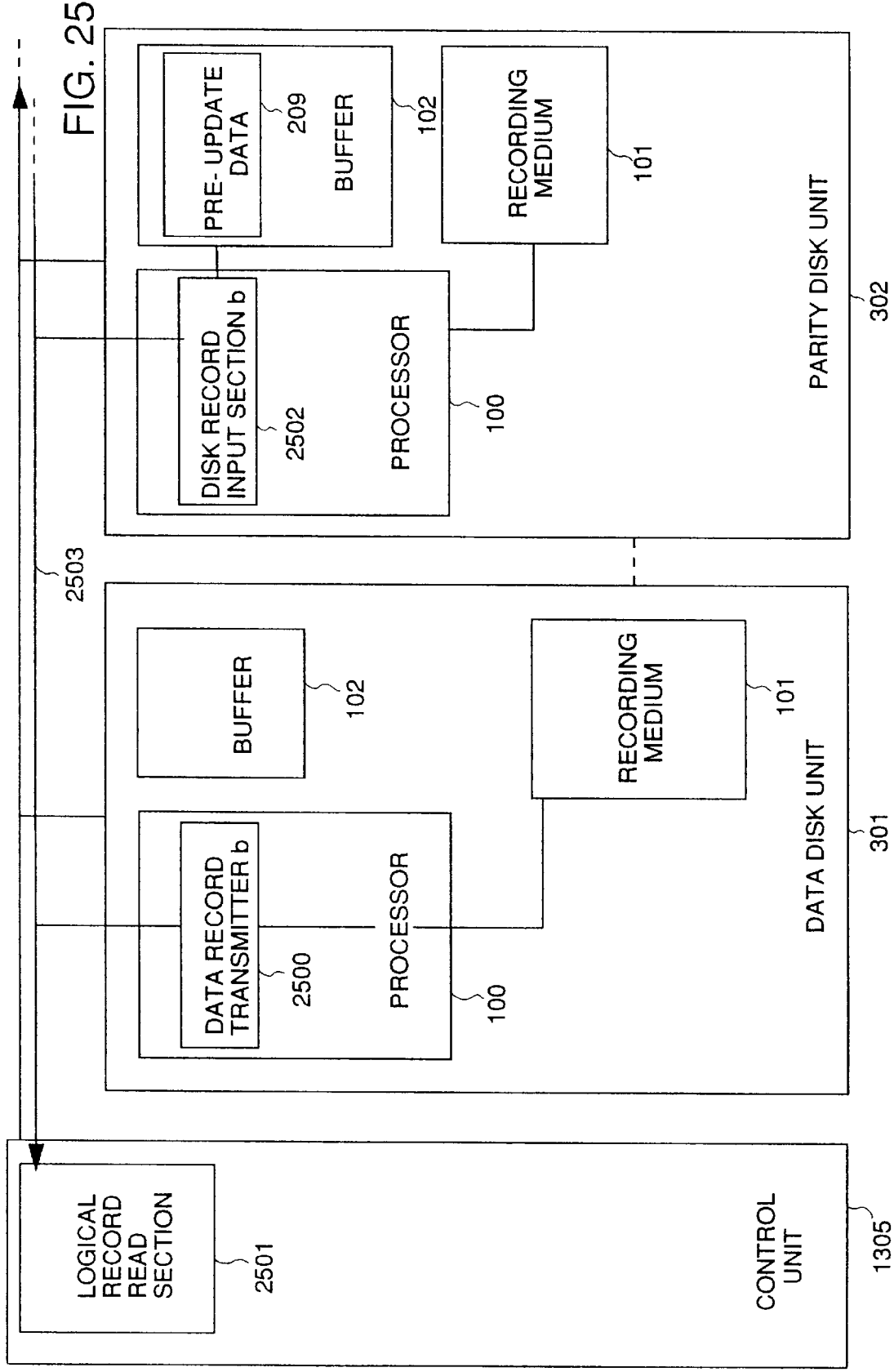

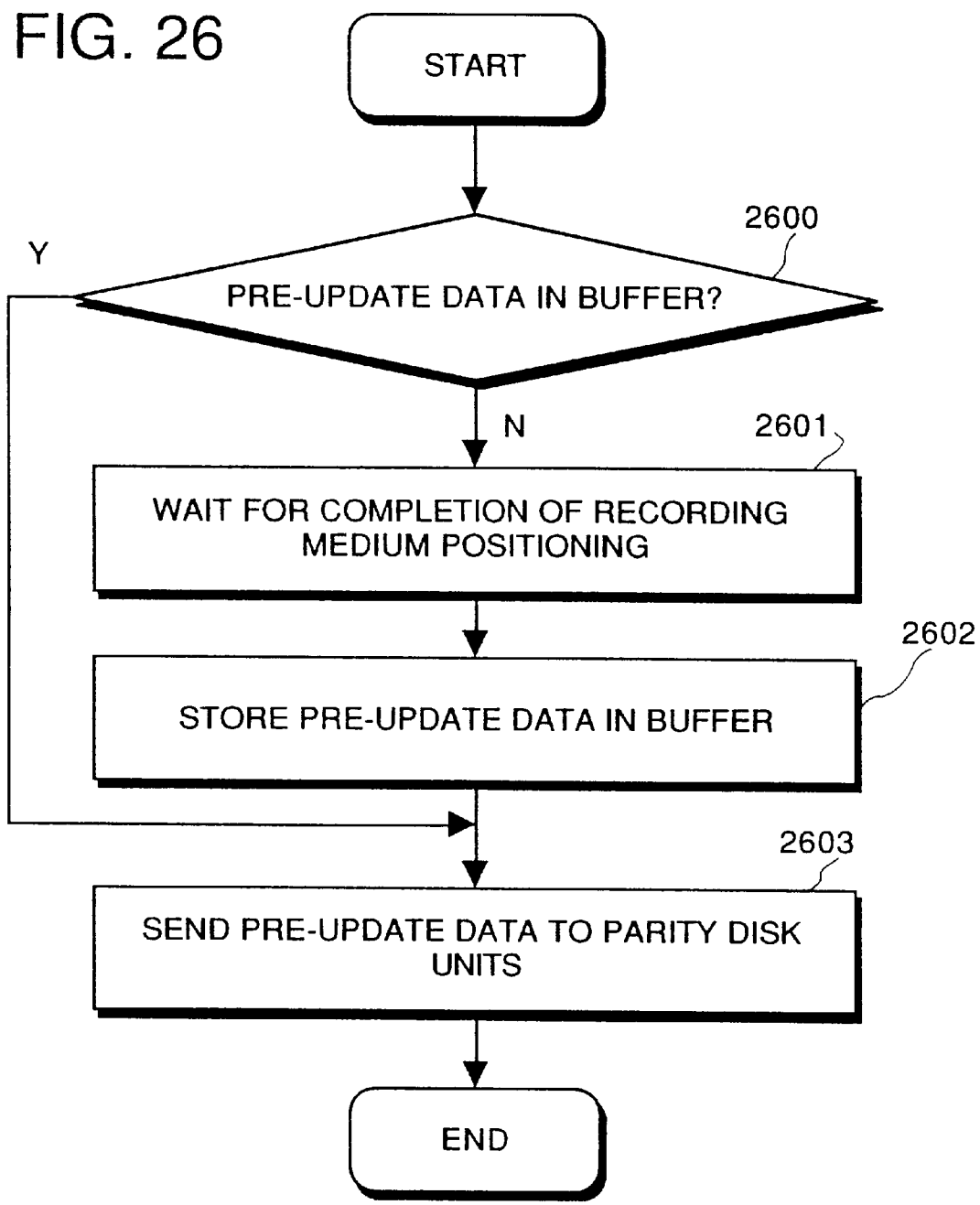

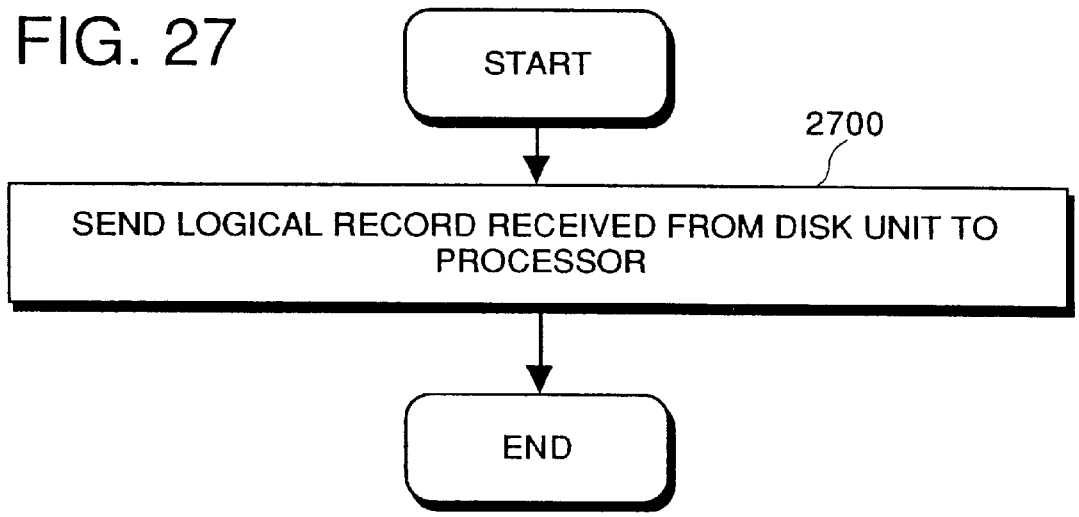
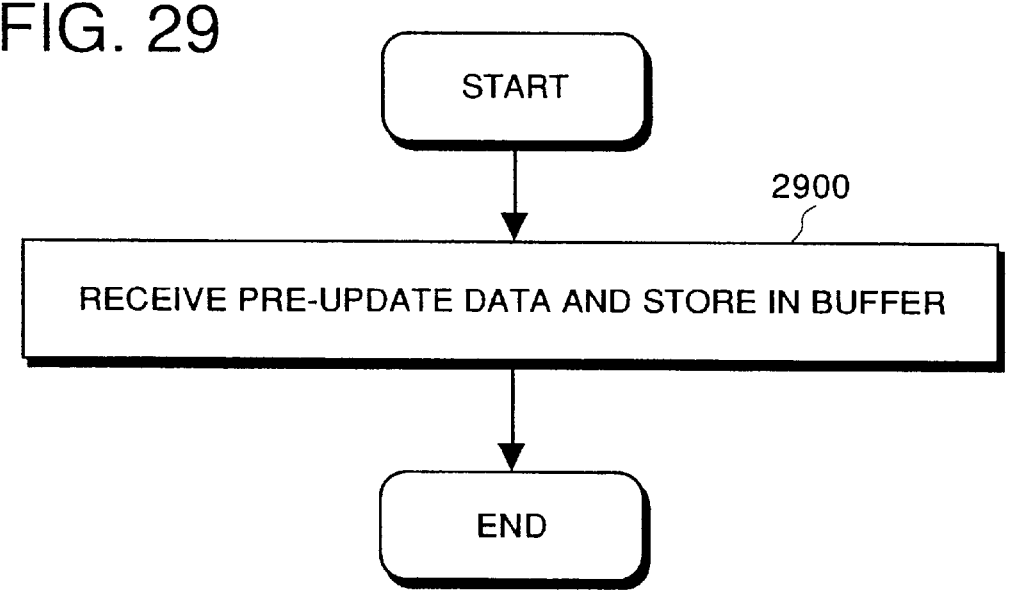

PARITY STORAGE UNIT, IN A DISK ARRAY SYSTEM, FOR GENERATING UPDATED PARITY DATA FROM RECEIVED DATA RECORDS

This is a continuation application of U.S. Ser. No. 08/739,441, filed Oct. 29, 1996, now U.S. Pat. No. 5,826, 002 which is a continuation application of Ser. No. 07/931, 923, filed Aug. 18, 1992, now U.S. Pat. No. 5,734,812.

BACKGROUND OF THE INVENTION

1. Field of the Invention

The invention relates to a high-performance disk unit suitable for a disk array and to a storage unit subsystem having a high-performance storage unit and a control unit.

2. Description of Related Art

A disk array or disk unit of the type to which the invention is directed is disclosed by D. Patterson, et al: A Case for Redundant Arrays of Inexpensive Disks (RAID), ACM SIGMOD Conference Proceedings, Chicago, Ill., Jun. 1–3, 1988, pp. 109–116. Specifically, Patterson's paper discloses technology related to the distribution of data in a disk array.

A disk array is a system for increasing the performance and reliability of a disk system. For achieving high performance in a disk array, a plurality of physically present disk units are used as a single disk unit. For achieving high reliability, on the other hand, when one or more disk units storing data breaks down redundant data is stored in one or more separate disk units so that the data in the broken down disk unit can be recovered.

The read/write unit of a disk unit is generally referred to as a record. Patterson's paper proposes a number of record distribution methods. In the case of using a disk array, however, the records constituting the read/write units from the viewpoint of the processor and the records actually written to the disk units are sometimes of different length. In this specification, the former will be called the logical record and the latter the physical record. Two of the record distribution methods proposed in Patterson's paper will now be explained.

In the first distribution method, the logical records, i.e. the records from the viewpoint of the processor side are stored in the disk units as divided into m number (m≧1) of physical records. This distribution method will hereinafter be called the divided distribution method. (This distribution method is called RAID 3 in Patterson's paper.) When divided distribution is used, a single logical record is transferred to/from m number of disk units and, therefore, it is possible to obtain an effect equivalent to that of increasing the apparent data transfer rate by a factor of m.

The method of generating redundant data in divided distribution will now be explained. In divided distribution, n pieces (n≧1) of redundant data are generated with respect to the m number of physical records into which the logical record is divided and each piece (of the total of n pieces) is stored in a disk unit as a physical record. Hereafter, the physical record storing the data directly read and written by the processor will be called the data record and the physical record storing the redundant data will be called the parity record. Ordinarily, if there are n number of parity records in a parity group, it is possible to recover the data in the parity group even if errors occur in up to n number of disk units.

In the second method, the logical record constituting a read/write unit from the viewpoint of the processor is stored in a single disk unit as a single physical record, namely as a single data record. This will hereafter be called undivided distribution. (This distribution method is called RAID 4 or RAID 5 in Patterson's paper.) In this method, the logical record is equivalent to the data record. (Since each physical record is designated to be a data record or a parity record, a physical record and a logical record are not necessarily equivalent. In other words, each logical record is a single physical record but each physical record is not necessarily a single logical record, and may instead be a parity record.) The distinguishable feature of undivided distribution is that each read/write operation can be executed at a single one of the disk units constituting the disk array. (When the divided distribution method is adopted, it is necessary to take over a plurality of disk units for read/write.) Therefore, when undivided distribution is used, it is possible to improve the concurrence of the read/write operation and thus realize enhanced performance. Undivided distribution also involves the generation and storage to disk of n number of parity records from m number of data records. However, differently from divided distribution, in which the set of data records in a parity group forms a single logical record from the viewpoint of the processor, in undivided distribution each data record is an independent logical record from the viewpoint of the processor.

Aside from the foregoing disk array technology, technology involving the use of a disk cache for increasing the speed of the write operation in ordinary disk units has also been disclosed.

Japanese Unexamined Patent Public Disclosures Sho 55-157053 teaches the use of a write-after process for speeding up execution of write requests in a control unit having a disk cache. More specifically, the control unit completes the write process at the stage of having completed writing of the write data received from the processor into the cache. The writing of the data received from the processor and stored in the cache, to the disk unit is done later by the write-after operation executed by the control unit.

Japanese Unexamined Patent Public Disclosure Sho 59-135563 teaches a control unit which speeds up the write process while simultaneously ensuring high reliability.

In Japanese Unexamined Patent Public Disclosure Sho 59-135563, the control unit is provided with a nonvolatile memory in addition to the cache memory and the write data received from the processor is stored in both the cache memory and the nonvolatile memory. For writing of the write data to the disk unit the processor executes a write-after operation. The write-after reliability is thus increased.

Japanese Unexamined Patent Public Disclosure Sho 60-114947 teaches a control unit equipped with a disk cache, which controls a dual write disk unit.

In Japanese Unexamined Patent Public Disclosure Sho 60-114947, the control unit responds to a write request received from the processor by writing the write data received from the processor to one of the disk units and the cache memory. Then, later and asynchronously with the read/write request from the processor, the control unit writes the write data stored in the cache memory to the other disk unit. The control unit's writing of the write data stored in the cache memory to the disk unit at a later time, asynchronously with the read/write request from the processor, is called the write-after operation.

Japanese Unexamined Patent Public Disclosure Hei 2-37418, the control unit again has a nonvolatile memory in addition to the cache memory and stores the write data received from the processor in the cache memory and the nonvolatile memory. Writing of the write data to the two disk units is executed by the control unit by a write-after operation. Japanese Unexamined Patent Public Disclosure Hei 3-37746, which relates to a control unit that has a disk cache and executes write-after operations, aims at enabling the write-after operations to be executed with good efficiency and teaches a management data structure for this purpose.

SUMMARY OF THE INVENTION

When a disk array is used, the change in the content of the logical record at the time a write request is received from the processor necessitates a change in the content of the parity record as well. As a result, transfer operations occur on the data transfer path between the control unit and the disk unit not only for (a) transferring the updated value of the logical record to be written but also for (b) writing the parity record and (c) providing the information required for generating the updated value of the parity record. Since these transfer operations become necessary when, and only when, a disk array is used, they can be considered to constitute transfer overhead unique to a computer system employing a disk array. The size of the increase in data transfer volume on the data transfer path between the control unit and the disk unit that a write operation entails differs depending on whether divided distribution or undivided distribution is used. This will be explained specifically for each of these two methods.

In the case of divided distribution, since the logical record received from the processor for writing corresponds to the content of all of the data records in the parity group, the parity record can be created from the updated value of the logical record received. As a result, no transfer operation is required for providing the information needed for generating the updated value of the parity record. This means that the data transfer overhead on the data transfer path between the control unit and the disk unit is limited to the write transfer volume for the transfer operation of writing the parity record.

In the case of undivided distribution, on the other hand, for generating the updated value of a parity record, an operation for obtaining one of the following value sets is required as the transfer operation for providing (c) the information needed for generating the updated value of the parity record.

(1) The pre-update value of the logical record generated by the write operation (=data record) and the pre-update value of the parity record.

(2) The values of all other data records in the parity group to which the logical record generated by the write operation (=data record) belongs.

Since the process for obtaining the values indicated in (1) generally entails less overhead, the following explanation will be made assuming that the values indicated in (1) are obtained at the time of the occurrence of a write operation. When the process for obtaining the values indicated in (1) is executed as the transfer operation for providing the information needed for generating the updated value of the parity record, two transfers occur even if only one parity record exists (n=1), one for the pre-update value of the logical record generated by the write operation (=data record) and one for the pre-update value of the parity record. Since, in addition, a transfer operation (a) for the updated value of the logical record to be written and a transfer operation for writing the parity record occur once each, the total number of data transfers between the control unit and the disk unit becomes four. When a disk array is not used, a write operation entails only a single data transfer operation (a) for transferring the updated value of the logical record to be written. The data transfer volume between the control unit and the disk unit when a disk array is operated by the undivided distribution method thus becomes four times the conventional volume.

From the foregoing it can be seen that the adoption of a disk array causes the throughput part of the transfer operation executed directly between the control unit and the processor to be reduced in proportion to the aforesaid transfer overhead.

The object of this invention is to suppress to the minimum possible the transfer overhead occurring between the control unit and the disk unit as a result of parity record handling.

It will now be explained how the invention achieves its object relative to the aforesaid problems.

As a basic capability for minimizing parity record handling related overhead between the control unit and the disk unit, the present invention provides the disk unit with the capability to generate parity records. However, while simply providing the disk unit with parity record generation capability enables a reduction of transfer overhead in undivided distribution it does not enable the transfer overhead to be reduced in divided distribution. The reason for this will now be explained taking as an example the case of only a single parity record, which is the case entailing the least transfer overhead.

As was explained earlier, in the conventional operation using undivided distribution, a data transfer to a write request requires, in addition to writing of the data record, reading of the pre-update values of the data record and the parity record and writing of the parity record, so that the transfer volume becomes four times that in a system not using a disk array. On the other hand, if the disk unit side is provided with parity generation capability, the control unit generates an intermediate value for generating the parity record from the pre-update value and the updated value of the data record and transfers the intermediate value to the disk unit. The intermediate value is generated, for example, from the exclusive-OR of the pre-update value of the data record and the updated value of the data record. The disk unit side generates the updated value of the parity record from the intermediate value for generating the parity record received from the control unit and the pre-update value of the parity record read and obtained from the recording medium and writes it to the recording medium. In the foregoing operations, the transfer operations between the control unit and the disk unit consist of one each for data record reading, data record writing, and transfer of the intermediate value for generating the parity record. The transfer volume can thus be held to three times that before adoption of the disk array.

In the case of divided distribution, however, since the parity record can be generated from the logical record received from the processor for writing, it is most efficient for the control unit to generate and send the parity record. As a result, the parity generation capability on the disk unit side cannot be used effectively.

For suppressing the transfer overhead of the data transfer path between the control unit and the disk unit, the invention further uses, in combination with the parity generation capability provided in the disk unit as the basic capability for this purpose, a capability for broadcast transfer between the control unit and the disk units. In this case, the transfer overhead can be reduced in either divided distribution or undivided distribution. This will now be explained in detail.

The case of divided distribution will be discussed first. In this case, the control unit broadcasts the logical record as it is, without division, to all disk units belonging to the parity group. At this time, the disk units in the parity group receiving the logical record can be classified into disk units that are to store a part of the logical record as a data record and disk units that are to store the parity record corresponding to the logical record. If a disk unit is one which is to store the data record, it extracts from the logical record the part that is to be written therein and writes the same to the recording medium. On the other hand, if the disk is one which is to store the parity record, it generates the parity record from the logical record and writes the same to the recording medium.

In the foregoing arrangement, the control unit transfers only the logical record. It is therefore possible to prevent the occurrence of any transfer overhead on the data transfer path between the control unit and the disk unit when a disk array is adopted.

The case of undivided distribution will now be explained. Again, the control unit broadcasts the logical record as it is, without division, to all disk units belonging to the parity group. In this case, the disk units in the parity group that receive the logical record can be classified into disk units that are to write the logical record (=data record) to their recording media, disk units that are not required to do anything, and disk units that are to store the parity record corresponding to the logical record. The disk units that are to store the parity record first have the disk storing the logical record transfer the pre-update value of the logical record. Next they read the pre-update value of the parity record from their recording media. The updated values of the parity record are generated form the so-obtained pre-update values of the parity record and the logical record and the updated value of the logical record first received, and are then written to the recording medium.

On the other hand, the disks that are to store the logical record (=data record) first send the pre-update value of the logical record (=data record) to the disk units that are to store the parity record. Next, they write the updated value of the logical record received from the control unit to the recording medium. In the foregoing operation, the data transferred between the control unit and the disk via the data transfer path is the pre-update value and the updated value of the logical record. In this case, therefore, the transfer volume on the data transfer path between the control unit and the disk unit can be held to double that before adoption of the disk array.

The effect of the invention will now be explained. The following explanation is made assuming only a single parity record, which is the case entailing the least transfer overhead.

First, an explanation will be given regarding the effect obtained when the basic capability, i.e. the capability to generate parity records provided in the disk unit, is applied to a disk array employing undivided distribution. As was explained earlier, application of the invention to undivided distribution requires transfer of the pre-update value of the logical record (=data record) appointed by the write operation and of the pre-update value of the parity record, bringing to four the total number of data transfer operations required for providing the information needed for generating the updated value of the parity record.

On the other hand, when the disk unit side is provided with parity generation capability, the control unit side generates the intermediate value from the pre-update and updated values of the logical record (=data record) and sends the same to the disk unit. The disk unit side generates the parity record from the intermediate value for generating the parity record received from the control unit and the pre-update value of the parity record read from the recording medium and writes the same to the recording medium. The number of data transfer operations required between the control unit and the disk unit is therefore three: one each for the pre-update value of the data record, the updated value of the data record and the intermediate value of the parity record. Since the number of data transfers required without the application of this invention is four, it is possible to achieve the invention's object of reducing the transfer overhead of the data transfer path between the control unit and the disk unit.

Next, an explanation will be given regarding the effect obtained when the basic capability, i.e. the capability to generate parity records provided in the disk unit, is applied to a disk array employing divided distribution in combination with the capability for broadcast transfer between the control unit and the disk units. As was explained earlier, unless the foregoing capabilities are provided in the case of divided distribution, the transfer of the parity record becomes an overhead between the control unit and the disk unit. When these capabilities are provided, the control unit broadcasts the logical record to all disk units belonging to the parity group, as it is without division. The disk units receiving the logical record execute the following processes. If the disk unit is one which is to store the data record, it extracts from the logical record the part that is to be written therein and writes this part to the recording medium. On the other hand, if the disk unit is one which is to store the parity record, it generates the parity record from the logical record and stores the parity record on the recording medium. Therefore, since the control unit is required to transfer only the logical record and is not required to transfer the parity record, it is possible to achieve the object of reducing the transfer overhead of the data transfer path between the control unit and the disk units.

Lastly, explanation will be given regarding the effect obtained when the basic capability, i.e. the capability to generate parity records provided in the disk unit, is applied to a disk array employing undivided distribution in combination with the capability for broadcast transfer between the control unit and the disk unit.

In this case again, the control unit broadcasts the logical record to all disk units belonging to the parity group. Upon receiving the updated value of the logical record, the disk units which are to store the parity record first have the disks storing the logical record transfer the pre-update value of the logical record (=data record). Next they read the pre-update value of the parity record from the recording medium. The updated value of the parity record is generated from the so-obtained pre-update values of the parity record and the logical record and the updated value of the logical record first received, and is then stored on the recording medium.

On the other hand, the disks that are to store the logical record (=data record) first send the pre-update value of the logical record (=data record) to the disk units that are to store the parity record. Next, they write the updated value of the logical record received from the control unit to the recording medium. In the foregoing operation, the number of data transfer operations between the control unit is two: one each for the pre-update value of the data record and the updated value of the data record. Since the number of data transfers required in divided distribution without the application of this invention is four, it is possible to achieve the invention's object of reducing the transfer overhead of the data transfer path between the control unit and the disk unit.

BRIEF DESCRIPTION OF THE DRAWINGS

FIG. 10 is a flowchart of an operation of a logical record write section.

FIG. 12 is a flowchart of an operation of a data record write section.

FIG. 25 shows the operation of a data disk unit broadcasting a logical record to parity disk units simultaneously with sending it to a control unit.

FIG. 26 is a flowchart of an operation of a data record transmitter.

FIG. 27 is a flowchart of an operation of a logical record read section.

FIG. 29 is a flowchart of an operation of a disk record input section.

DETAILED DESCRIPTION OF THE PREFERRED EMBODIMENTS

Figure 13:
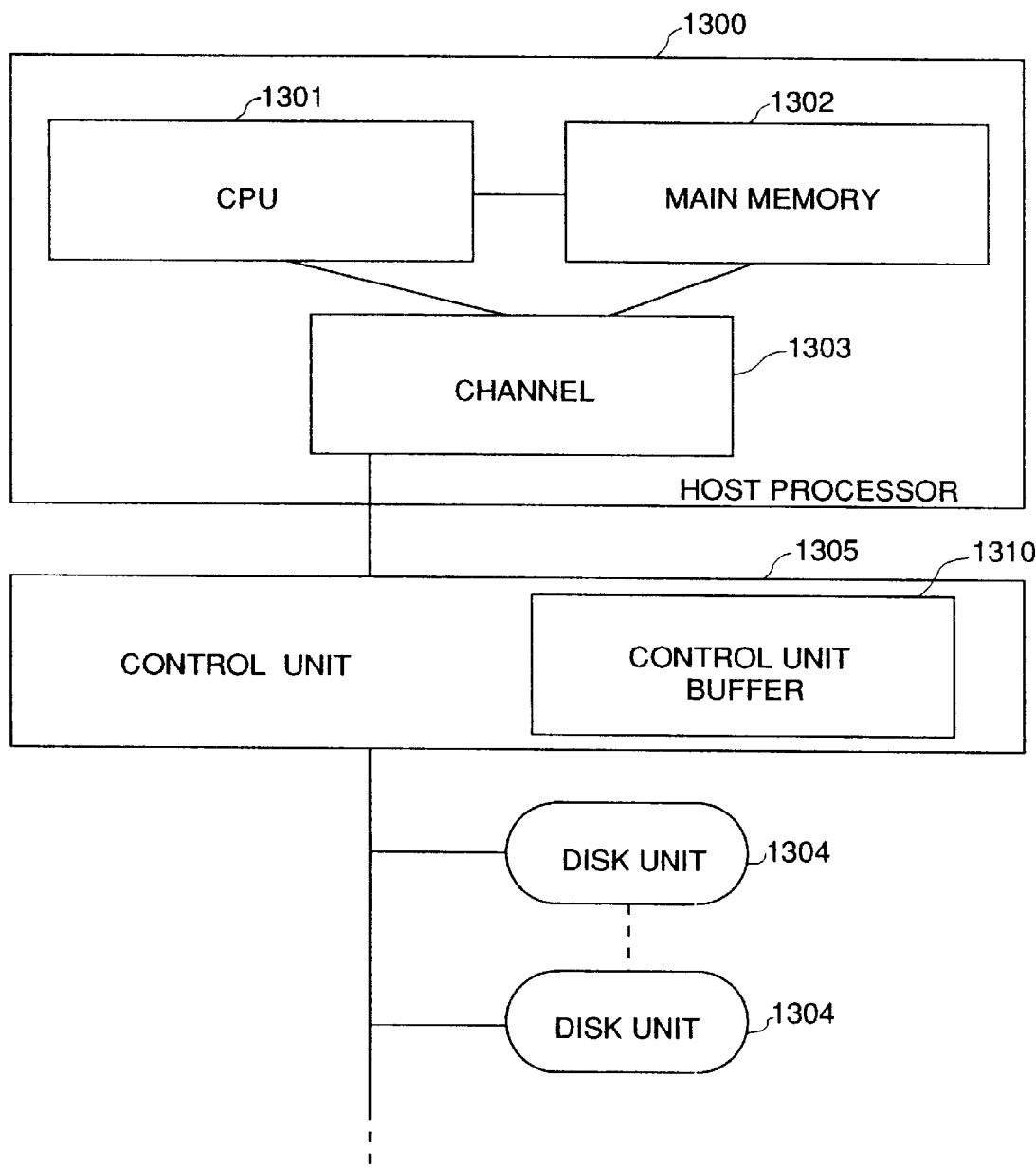
FIG. 13 shows the configuration of a computer system to which the invention can be applied.
Figure 28:
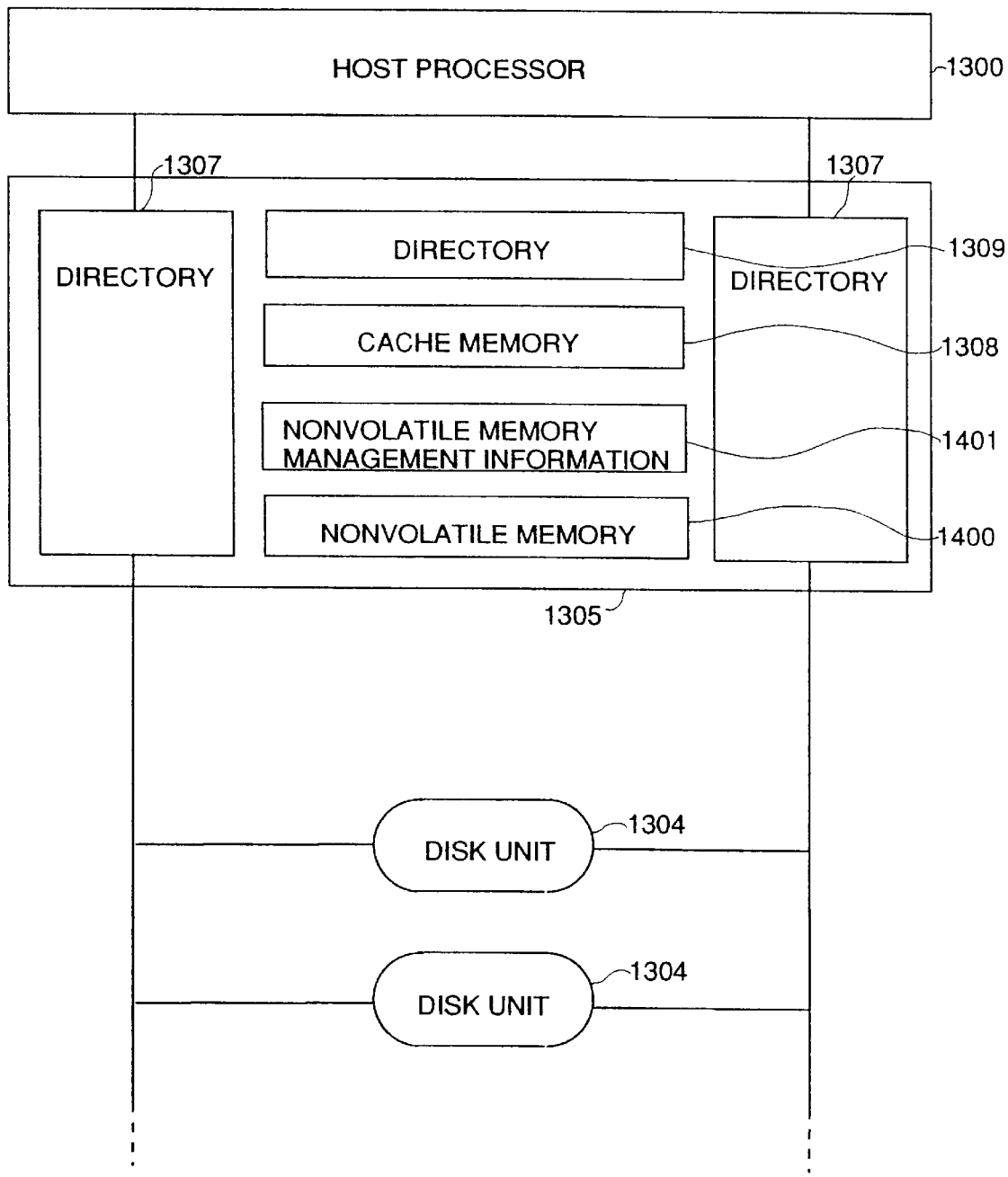
FIG. 28 shows a configuration of the control unit of the invention including two or more directors.

Matters common to all of the embodiments will first be explained. FIG. 13 shows the configuration of a computer system to which this invention can be applied. The computer system comprises a host processor 1300, a control unit 1305 and one or more disk units 1304. The processor 1300 can be constituted of a CPU 1301, a main memory 1302 and a channel 1303. The control unit 1305 executes transfer operations between the host processor 1300 and the disk units 1304 in accordance with read/write requests from the host processor 1300. A control unit buffer 1310 is provided for temporarily storing the data to be read or written by the control unit 1305. However, the invention can also be effectively applied to a configuration wherein, as shown in FIG. 28, the control unit includes two or more directories 1307 which execute read/write operations upon receiving read/write requests from the host processor 1300.

Figure 14:
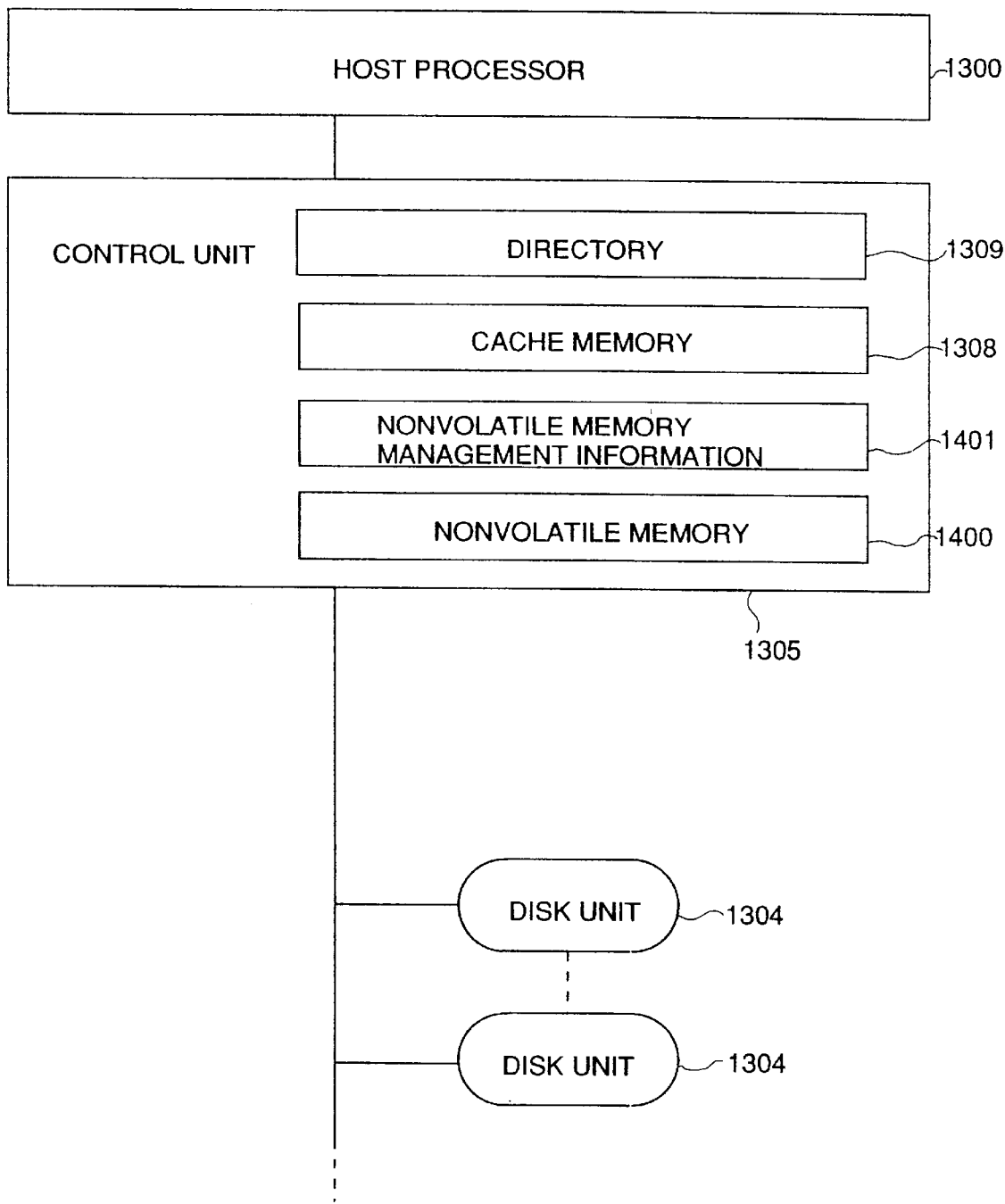
FIG. 14 shows the configuration of another computer system to which the invention can be applied.

FIG. 14 shows another computer system configuration to which the invention can be applied. The difference between this configuration and that of FIG. 13 is that the control unit 1305 includes a cache memory 1308, a directory 1309, a nonvolatile memory 1400 and nonvolatile memory management information 1401. Data in the disk units 1304 that have a high access rate are loaded into the cache memory 1308 (hereinafter called "cache 1308"). The directory 1309 stores the management information for the cache 1308. The nonvolatile memory 1400 is a nonvolatile medium and, like the cache 1308, is loaded with data from the disk units 1304 having a high access rate like the cache 1308. The nonvolatile memory management information 1401 is also a nonvolatile medium and stores management information for the nonvolatile memory 1400. In this configuration, the control unit 1305 executes read/write operations between the disk units 1304 and the cache 1308 asynchronously with the read/write request from the host processor 1300. The data unit for read/write between the host processor 1300 and the disk units is ordinarily called a record. Where a disk array is not adopted, a record from the viewpoint of the host processor 1300 and a record stored in a disk unit 1304 are the same. On the other hand, when a disk array is used, the record from the viewpoint of the host processor 1300 and the record stored is the disk units 1304 may, depending on the record distribution in the disk array, be different. The store format in the case where a disk array is adopted will now be explained.

The store format on the disk units 1304 in the case where a disk array is adopted will be explained with reference to FIGS. 15 and 16.

Figure 15:
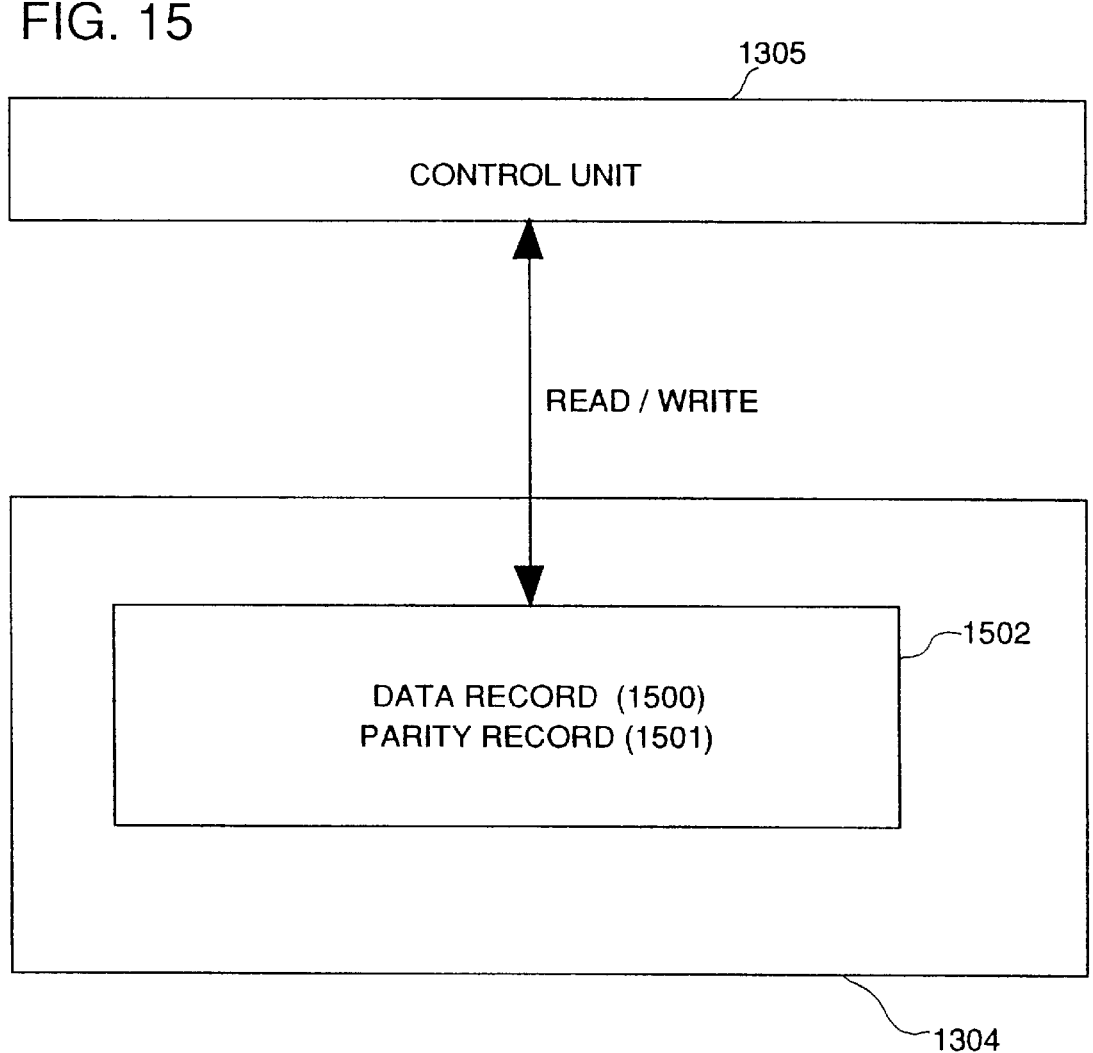
FIG. 15 shows the structure of a physical record to be stored in a disk unit.

As shown in FIG. 15, the read/write unit between the disk units 1304 and the control unit 1305, namely the unit stored in a disk unit 1304, is called a physical record 1502. In this invention, the physical records 1502 stored in the disk units 1304 are of two types: data records 1500 and parity records 1501. A data record 1500 is a physical record 1502 storing data directly read or written by the processor 1300. A parity record 1501 is a physical record 1502 used in a recovery process for recovering the content of a data record 1500 lost as the result of an error occurring in a disk unit. In this case, when the value of a data record 1500 has been changed, it also becomes necessary to change the content of the parity record 1501 accordingly.

Figure 16:
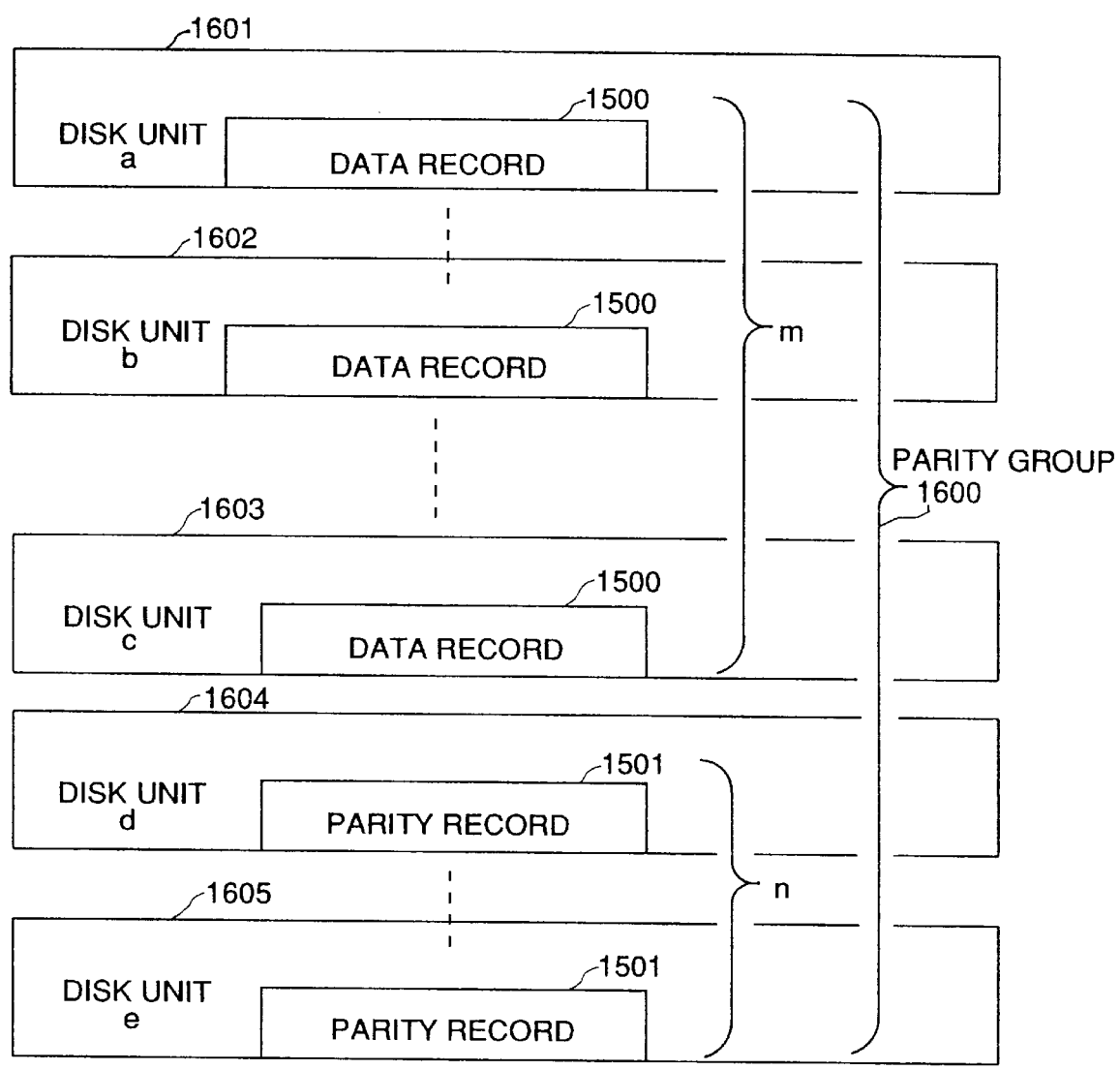
FIG. 16 shows the structure of a parity group in a disk array.

FIG. 16 shows the structure of a parity group 1600 in the disk array. A data record 1500 is stored in each of m number of the disk units (disk unit a 1601 to disk unit c 1603). From the m number of data records 1500 there are generated n number of parity records 1501, which are stored in disk units d 1604 to e 1605. Thus, in FIG. 16, the parity group 1600 is constituted of m number of data records 1500 and n number of parity records 1501. In a parity group 1600 including n number of parity records 1501, it is generally possible to recover the content of all physical records 1502 in the parity group 1600 even if n number of disk units 1304 of total of m+n number of disk units storing the records 1502 of the parity group 1600 should breakdown. Because of this, the use of a disk array makes it possible to improve the reliability of the disk units 1304 to a high level.

In the parity group 1600 of FIG. 16, in disk unit a 1601 to a disk unit c 1603, parity records 1500 are stored in disk unit d 1604 to disk unit e 1605. However, not all of the physical records 1502 stored in the disk units 1304 between disk unit a 1601 and disk unit c 1603 are required to be data records 1500. Similarly, not all of the physical records 1502 in the disk units 1304 between disk unit d 1604 and disk unit e 1605 are necessarily parity records 1501.

Moreover, while in FIG. 16 the parity group 1600 is created on disk units a 1601 to e 1605, the set of disk units 1304 of which the parity group 1600 is created can differ from one parity group 1600 to another. For example, a different parity group 1600 might be created from disk unit b 1602 to disk unit e 1605. Similarly, the number of physical records 1502 constituting a parity group 1600 is not limited to m+n.

In the interest of simplicity, however, the embodiments set out below will be explained using parity group 1600 constituted of n number of data records 1500 and n number of parity records 1501, in the manner of FIG. 16 wherein m=3 and n=2.

When a disk array is adopted, the relationship between the records from the viewpoint of the processor 1300 and the data records 1500 on the disk units 1304 may differ depending on the record distribution method. Two typical disk array record distribution methods, the divided distribution method and the undivided distribution method, will be explained with reference to FIGS. 17 and 18.

Figure 17:
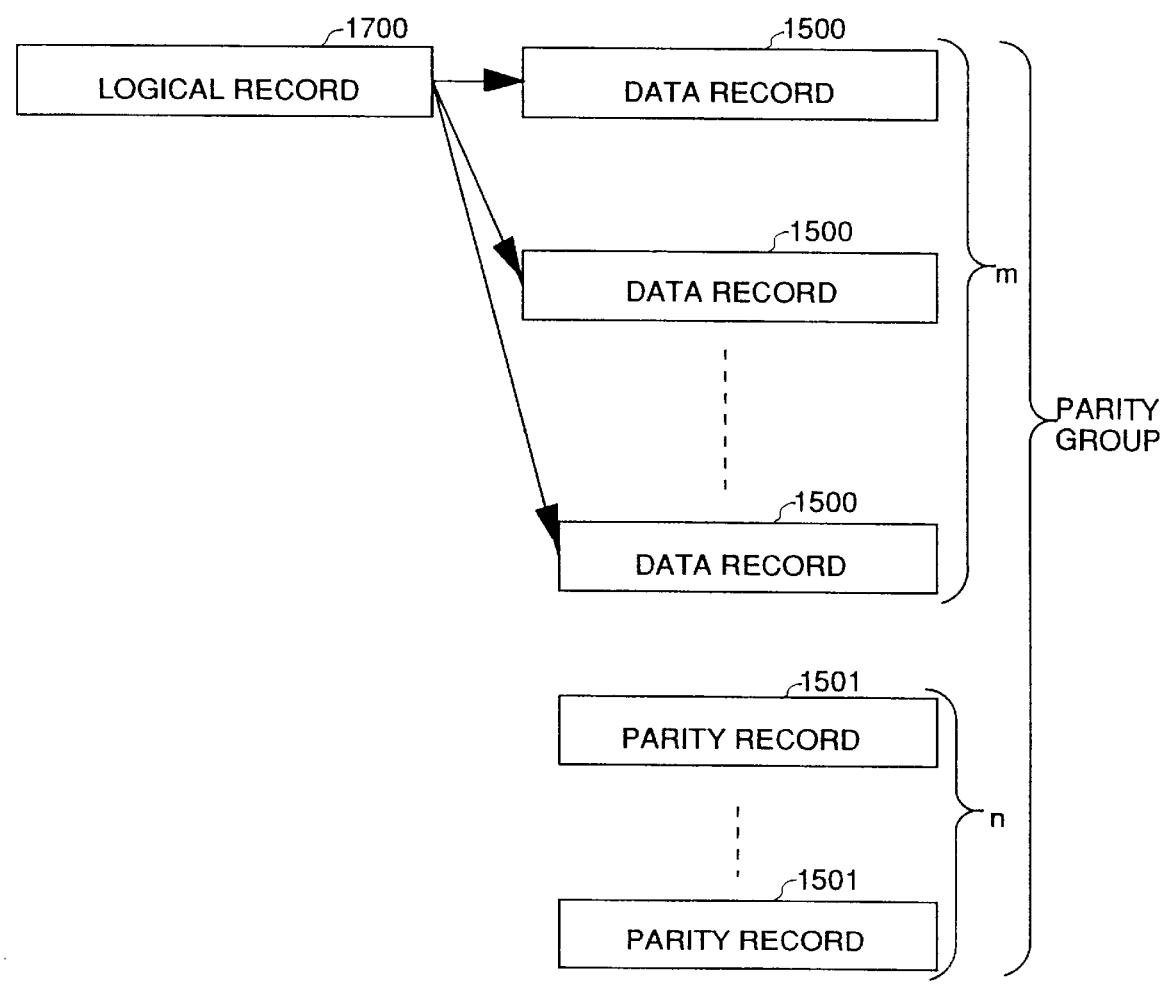
FIG. 17 shows a record distribution in a divided distribution disk array.

FIG. 17 shows the record distribution in a divided distribution disk array. In the embodiments set out below, the read/write unit between the processor and the control unit 1305, i.e. the read/write unit from the viewpoint of the host processor 1300, will be called a logical record 1700. In the divided distribution disk array, the logical record 1700 is divided into m number of parts, each of which is stored in a disk unit 1304 as a data record 1500. In addition, n number of parity records 1501 are generated from the m number of data records 1500 and are stored one each in disk units 1304. In the case of divided distribution, therefore, a single logical record 1700 constitutes a single parity group 1600.

When divided distribution is used, a single logical record 1700 is transferred to/from m number of disk units and, therefore, it is possible to obtain an effect equivalent to that of increasing the apparent data transfer rate by a factor of m. For a single read/write operation, however, it becomes necessary to take over at least m number of disk units 1304.

Figure 18:
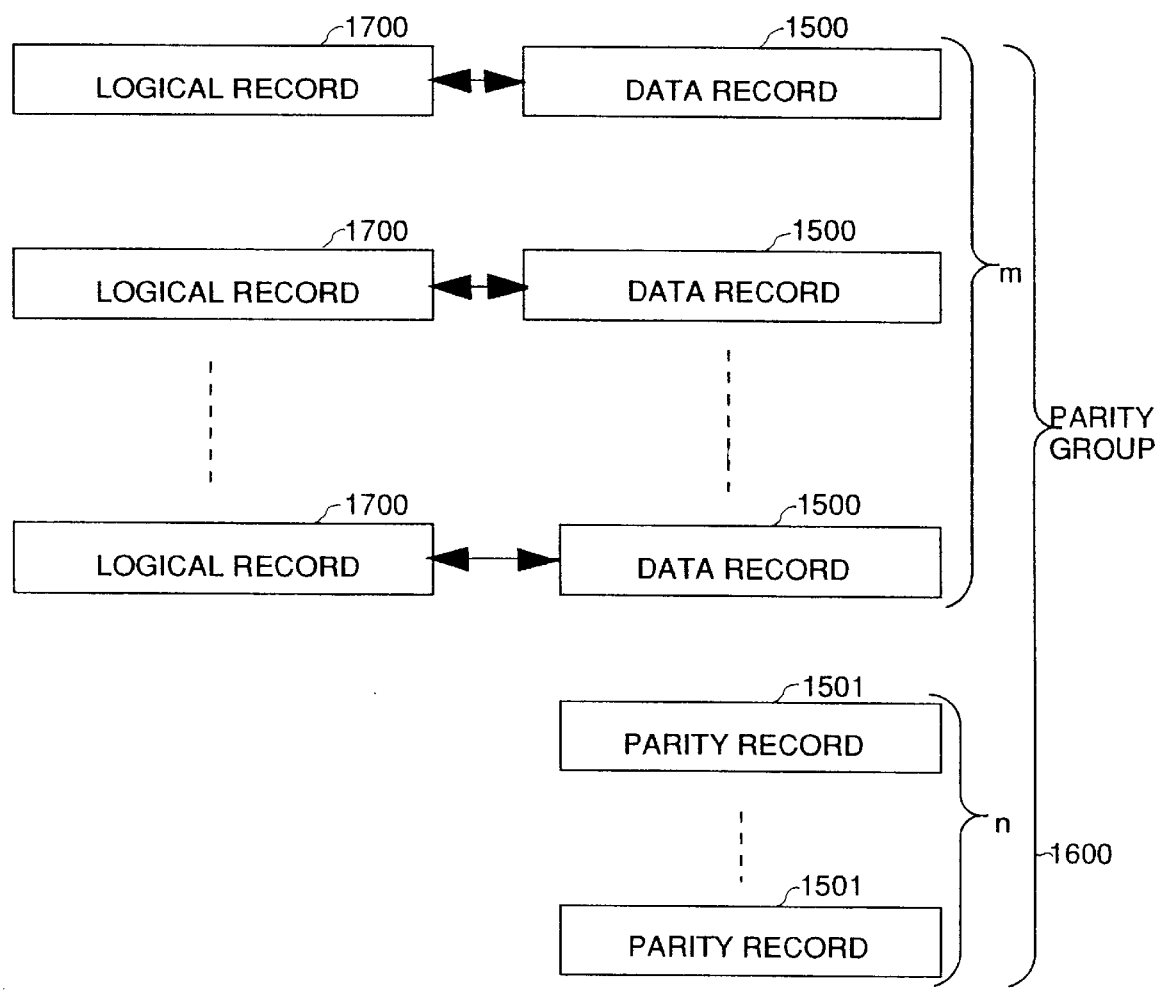
FIG. 18 shows a record distribution in an undivided distribution disk array.

FIG. 18 shows the record distribution in an undivided distribution disk array. In undivided distribution, a single logical record is stored in a disk unit 1304 as a data record 1500. In other words, the logical records 1700 and the data records 1500 correspond on a one-to-one basis and thus are equivalent. In undivided distribution, therefore, a single parity group 1600 includes m number of logical records 1700.

When undivided distribution is adopted, only one disk unit 1304 need be taken over for read/write of a logical record 1700 and it is therefore possible to improve the concurrence of the read/write operations in the disk array.

When a disk array is adopted, the writing of a logical record 1700 makes it necessary to rewrite the content of the parity record 1501, in both divided distribution and undivided distribution. Because of this, the adoption of a disk array creates a problem in that the volume of the data read and written between the disk units 1304 and the control unit 1305 is increased in comparison with the conventional disk volume. The percentage of read/write data volume increase is particularly high in the case of undivided distribution. The amount of increase in read/write data in each of the distribution methods will now be explained.

In the case of divided distribution, the parity records 1501 are generated from the contents of the m number of data records 1500 obtained by division of the logical record 1700 received for writing from the processor 1300. Moreover, the write data volume corresponding to the logical record 1700, i.e. to the m number of data records 1500, would also be written in a conventional disk unit and therefore does not increase the write data volume. In the case of divided distribution, therefore, the only additional read/write data caused by use of a disk array is the parity record write data.

In contrast, in undivided distribution, the parity record 1501 cannot be generated from the contents of the logical record 1700 received for writing from the processor 1300. In this case, the updated value of the logical record 1700 generated by the write process is not by itself sufficient and it is also necessary to execute a read operation for obtaining one of the following sets of values.

(1) The pre-update value of logical record 1700 generated by the write operation, namely the pre-update value of the corresponding data record 1500 and the pre-update value of the parity record 1501.

(2) The value of all other data records 1500 in the parity group 1600 to which the logical record 1700 (=data record 1500) generated by the write operation belongs.

There is generally less overhead involved in obtaining the values indicated in (1) and, therefore, the method for obtaining the values indicated in (1) at the time of the occurrence of a write operation will be explained. The read process for obtaining the values indicated in (1) that has to be conducted in addition to the write process for writing the data record 1500 therefore constitutes an increase in transfer overhead over that in a conventional disk unit. Because of this, even in a case where only a single data record 1500 is created (n=1), the volume of the read/write data increases to four times that in the system before the adoption of the disk array.

This invention relates to a computer system adopting a disk array and the gist thereof lies in providing the disk units 1304 of the disk array with the capability to generate parity records 1501, thereby reducing the transfer volume of read/write data occurring between the disk units 1304 and the control unit 1305 in connection with the writing of the logical records 1700. The invention will now be explained with reference to FIG. 1.

The configuration of the disk units 1304 will be explained first. The disk unit 1304 has a recording medium 101 on which the physical records 1502 are actually stored. It also has a processor 100 for read/write of the physical records 1502 received from the disk units 1304 to the recording medium 101. In this invention, the processor 100 is further provided with the capability to generate the updated value of parity records 1501. A buffer 102 is provided in the disk unit 1304 as a memory used at the time of generating the updated value of a parity record 1501 or the like. The buffer management information 107 indicates what data is stored in the buffer 102.

The disk unit 1304 executes parity record 1501 update processing in accordance with instructions from the control unit 1305. This will be explained. A parity information input section 103 in the processor 100 receives from the control unit 1305, or from the recording medium 101 information (parity input data 108), or from other disk units 1305, data for generating the updated values of the parity records 1501 and stores the parity input data 108 to the buffer 102 (109). A parity generator 104 receives the parity input data 108 stored in the buffer 102 by the parity information input section 103 (110) and generates the updated value of the parity record 1501 as updated parity value 106, which it stores in the buffer 102 (111). After this, a parity record write section 105 writes (112) the updated parity value 106 stored in the buffer 102 to the recording medium 101.

While the foregoing summarizes the invention, embodiments relating to three types of parity record generation capability will be disclosed in the following. A brief explanation of each embodiment will be given first.

The first embodiment relates to a disk array using undivided distribution in which the disk units 1304 have simply been provided with parity record generation capability.

A brief explanation of the first embodiment will now be made with reference to FIG. 2. As was stated earlier, in a disk array using undivided distribution, the updated value of a parity record 1501 can be generated from the updated value of the logical record 1700 (=data record 1500) received from the host processor 1300, the pre-update value of the logical record 1700 and the pre-update value of the parity record 1501.

Using undivided distribution with disk units 1304 lacking parity record generation capability would lead to data transfers between the control unit 1305 and the disk unit 1304 for reading of the logical record 1700 and the parity record 1501 and for writing of the logical record 1700 and the parity record 1501, thus increasing transfer volume to four times that without use of a disk array.

The operation in the case where the disk units 1304 are provided with parity generation capability will now be explained with reference to FIG. 2. In the control unit 1305, an intermediate parity value generator 201 receives pre-update data 209, which is the pre-update value of the logical record 1700 (=data record 1500) read (206) from the disk unit 1304, and updated logical record value 210, which is the updated value of the logical record 1700 received (204) from the host processor 1300, and generates an intermediate parity value 200, which is an intermediate value for generating the parity record. The control unit 1305 further stores (213) the generated intermediate parity value 200 in the cache 1308. When the control unit 1305 does not have the cache 1308, however, it stores the intermediate parity value 200 in the control unit buffer 1310, for example, as shown in FIG. 13. Following this, an intermediate parity value transmitter 202 in the control unit 1305 sends (214) the intermediate parity value 200 to the disk unit 1304.

An intermediate parity value input section 203 of the disk unit 1304 stores (214) the intermediate parity value 200 received from the control unit 1305 in the buffer 102. Next, a parity reader 205 reads the pre-update value of a parity record 1501 from the recording medium 101 and stores (215) it in the buffer 102 as pre-update parity 207. The intermediate parity value 200 and the pre-update parity 207 are further input (216) to a parity generation section a 208, which generates the updated parity value 106 and stores (102) it in the buffer 102. Following this, the parity record write section 105 writes (112) the updated value of the parity record 1501 stored in the buffer 102 to the recording medium 101.

The transfers between the control unit 1305 and the disk unit 1304 in the foregoing operations are those for reading and writing the data record 1500 and for transferring the intermediate parity value 200. The transfer is thus held to three times that before the adoption of the array disk.

In the second and third embodiments, the disk units 1304 are provided with the parity record generation capability and the capability is used in combination with a capability for broadcast transfer between the control unit 1305 and the disk unit 1304.

In the second embodiment, the capability for parity record generation provided in the disk units 1304 is applied to a divided distribution disk array in combination with a capability for broadcast transfer between the control unit 1305 and the disk units 1304. The embodiment will now be briefly explained with reference to FIG. 3.

In this case, a logical record write section 300 of the control unit 1305 broadcasts (304) the updated logical record value 210 received from the processor 1300 to the m+n number of disk units 1304 belonging to the parity group 1600, as it is without division. At this time, the disk units 1304 in the parity group 1600 receiving the updated logical record value 210 are separated into m number of data disk units 301 that are to store a part of the updated logical record value 210 as data records 1500 and n number of parity disk units 302 that are to store the parity records 1501 corresponding to the logical record 1700 to be updated. However, being a data disk unit 301 or a parity disk unit 302 is not a fixed attribute of the individual disk units 1304 and this attribute is decided separately for each logical record 1700 to be transferred.

In the case of the data disk units 301, a logical record input section 306 thereof first stores the updated logical record value 210 received from the control unit 1305 in the buffer 102. Next, a data record write section a 303 thereof extracts from the updated logical record value 210 the data record 1500 to be written to its own unit and writes (307) a data record 1500 to the recording medium 101.

In the case of the parity disk units 302, the updated logical record value 210 is stored to the buffer 102 in the same manner and then a parity generation section b 305 generates the updated parity value 106 to be written to its own unit from the logical record 1700. Following this, the parity record write section 105 writes (112) the updated value of the parity record stored in the buffer 102 to the recording medium 101.

When divided distribution is used without employing parity record generation capability and broadcast transfer capability, the amount of increase in data transferred between the control unit 1305 and the disk units 1304 is equivalent to the transfer volume of the parity records 1501. When parity record generation capability and broadcast transfer capability are used, however, the fact that the control unit 1305 has to transfer only the logical record 1700 makes it possible to prevent any increase in transfer overhead because of the adoption of a disk array.

Figure 3:
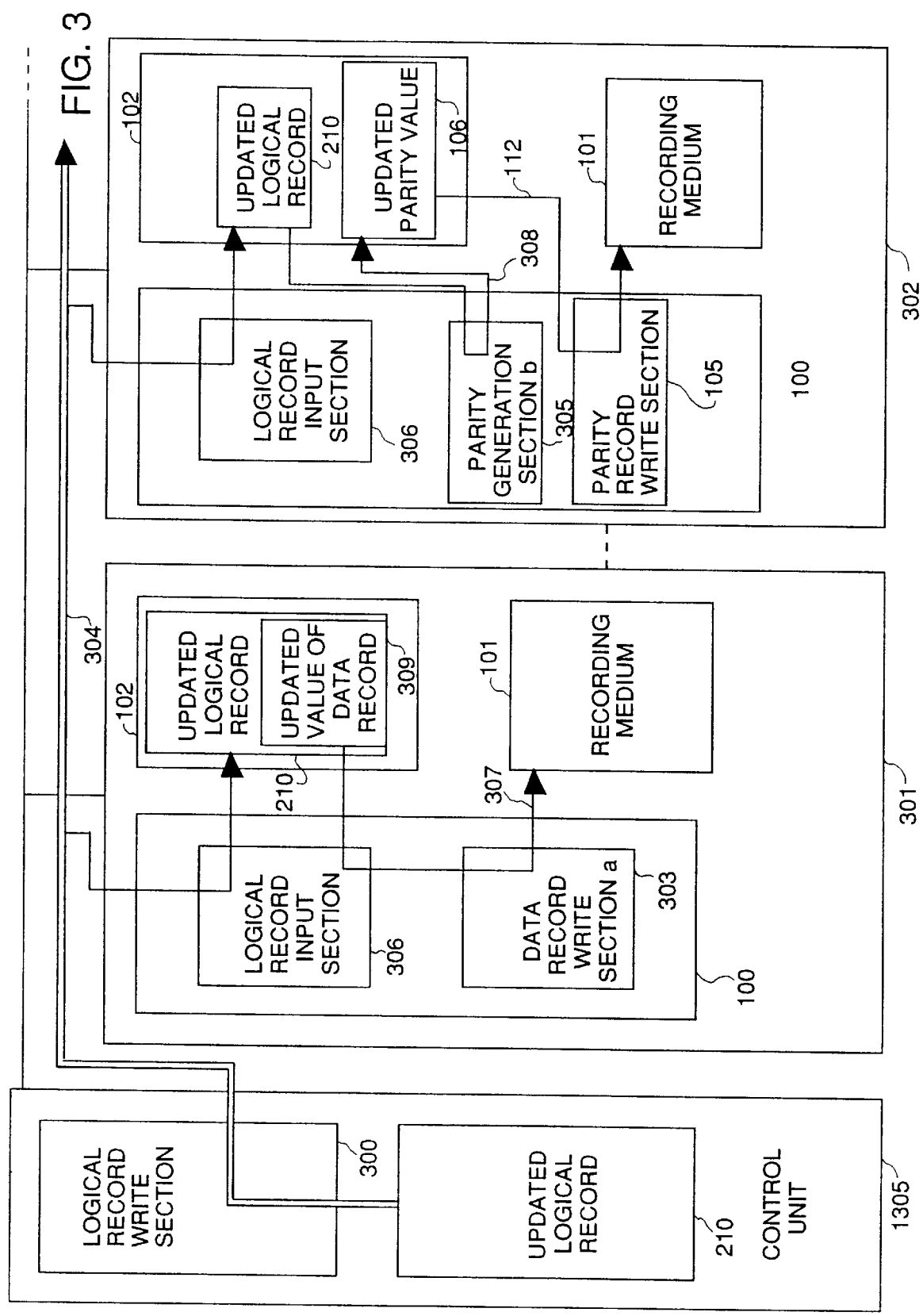
FIG. 3 is a schematic view of a second embodiment of the invention.

The processing indicated in FIG. 3 can also be applied to an undivided distribution disk array for updating all of the logical records 1700 (=data records 1500) in the parity groups 1600 at one time. This is because in an undivided distribution disk array the processing indicated in FIG. 3 amounts to nothing less than a broadcasting of all of the updated values of the data records 1500 in the parity group 1600.

Figure 4:
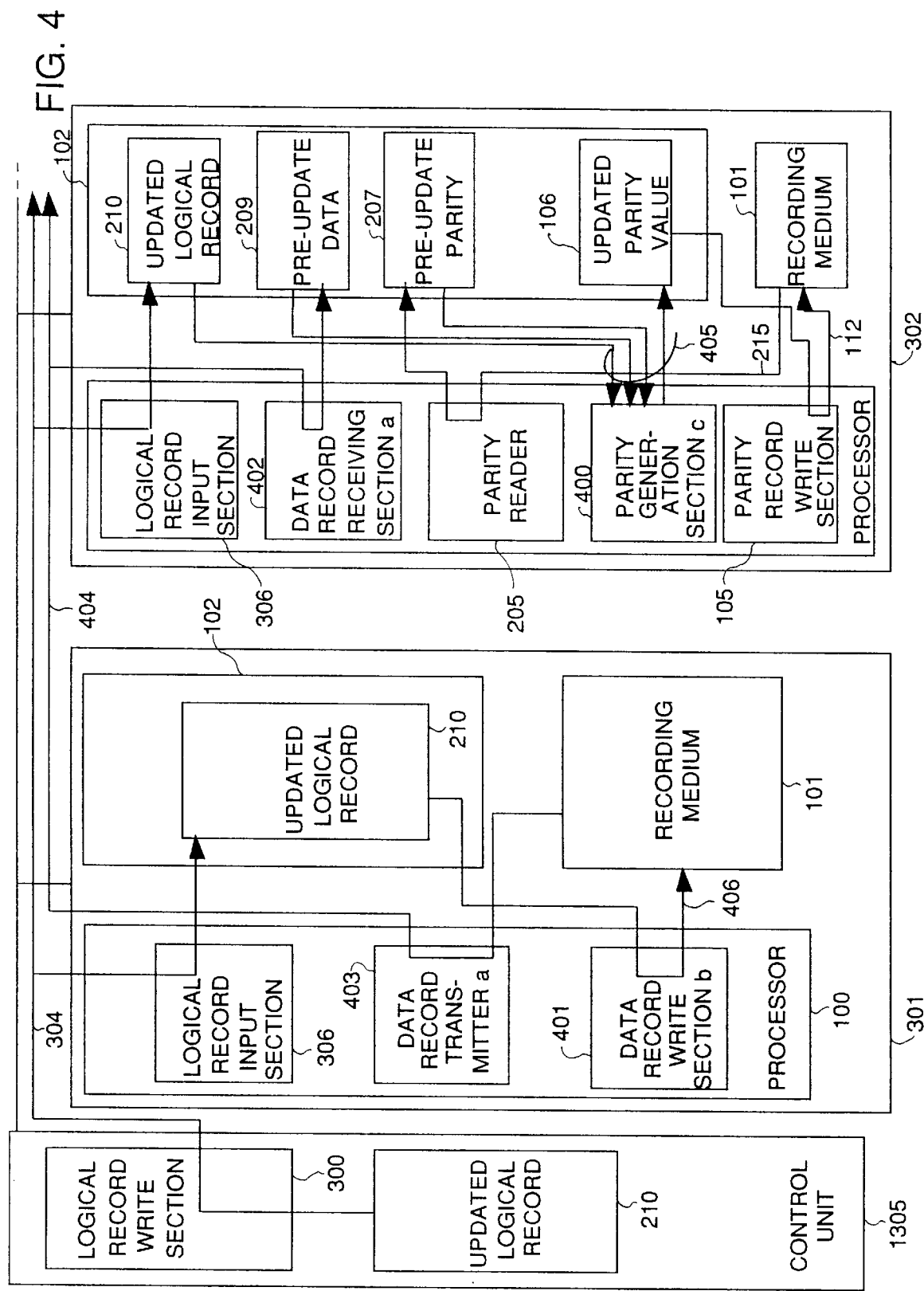
FIG. 4 is a schematic view of a third embodiment of the invention.

In the third embodiment, the capability for parity record generation provided in the disk units is applied to an undivided distribution disk array in combination with a capability for broadcast transfer between the control unit 1305 and the disk units. The embodiment will now be briefly explained with reference to FIG. 4.

As in the second embodiment, in the third embodiment the logical record write section 300 broadcasts (304) the updated logical record value 210 received from the processor to the m+n number of disk units belonging to the parity group, as it is without division. In this case, the disk units in the parity group are separated into one data disk unit 301 that is to store the logical record 1700 (=data record 1500) as it is, m−1 number of disk units that are not required to do anything, and n number of parity disk units 302 that are to store the parity record 1501 corresponding to the logical record 1700. As in the second embodiment, being a data disk unit 301, a parity disk unit 302 or a disk unit that need do nothing is not a fixed attribute of the individual disk units and this attribute is decided separately for each logical record 1700. Further, sending of the updated logical record value 210 to the m−1 number of disk units that need do nothing can be omitted. The m−1 number of disk units that need do nothing require no particular explanation and are therefore not shown in FIG. 4.

As in the second embodiment, the logical record input section 306 of the parity disk unit 302 stores (304) the updated logical record value 210 in the buffer 102. Next, a data record receiving section a 402 of the parity disk unit 302 receives the pre-update data 209, which is the pre-update value of the logical record 1700 (=data record 1500), from the data disk unit 301 storing the logical record 1700 (=data record 1500) and stores (404) it in the buffer 102. Further, the parity reader 205 reads (215) the pre-update parity 207 from the recording medium 101. The updated logical record value 210, pre-update data 209 and the pre-update parity 207 obtained in the foregoing manner are input (405) to a parity generation section c 400, which generates the updated parity value 106. Following this, the parity record write section 105 writes (112) the updated parity value 106 of the parity record 1501 stored in the buffer 102 to the recording medium 101.

In the case of the data disk units 301, similarly to in the second embodiment, the logical record input section 306 first stores the updated logical record value 210 in the buffer 102. Next, the pre-update data 209 is sent to the n number of parity disk units 302. Following this, a data record write section b 401 writes the updated logical record value 210 received from the control unit 1305 to the recording medium 101 as the updated value of the data record 1500.

In the foregoing operation, the data transferred using the data transfer path between the control unit 1305 and the disk units 1304 are the pre-update and updated values of the logical record 1700. In this case, therefore, the data transfer volume between the control unit 1305 and the disk units 1304 can be held to double that prior to the adoption of the disk array.

The embodiments will now be explained in detail, starting with the first embodiment.

The first embodiment relates to a disk array using undivided distribution whose disk units 1304 are provided with parity record generation capability. What makes it possible to reduce the transfer volume on the data transfer path between the control unit 1305 and the disk units 1304 in the first embodiment is that the control unit 1305 generates the intermediate parity value 200 from the updated value of the logical record 1700 (=data record 1500) received from the host processor 1300 and the pre-update value of the logical record 1700 and transfers the generated intermediate parity value 200 to the disk units 1304.

Figure 1:
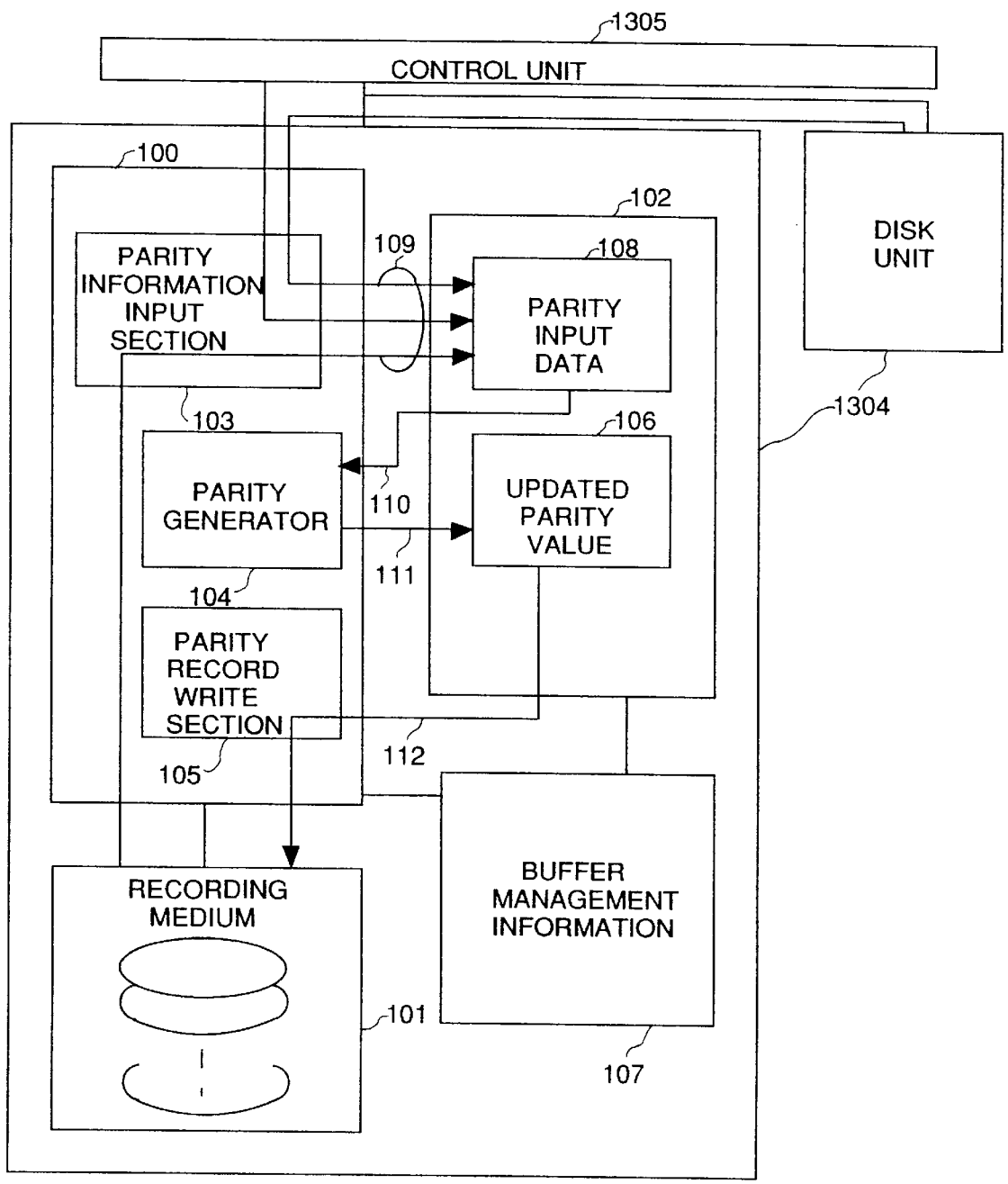
FIG. 1 is a schematic view of the invention.

The processing flow of the intermediate parity value generator 201 and the intermediate parity value transmitter 202 shown in FIG. 1, which enables the foregoing capability, will now be explained. The processing can be executed synchronously with a write request for updating the logical record 1700 received form the host processor 1300 or can be executed asynchronously therewith after returning a write request completion report. Irrespective of whether executed synchronously or asynchronously, however, it is necessary to start the execution after the logical record 1700 received from the host processor 1300 has been stored in the control unit memory 1310 or the cache 1308.

Figure 2:
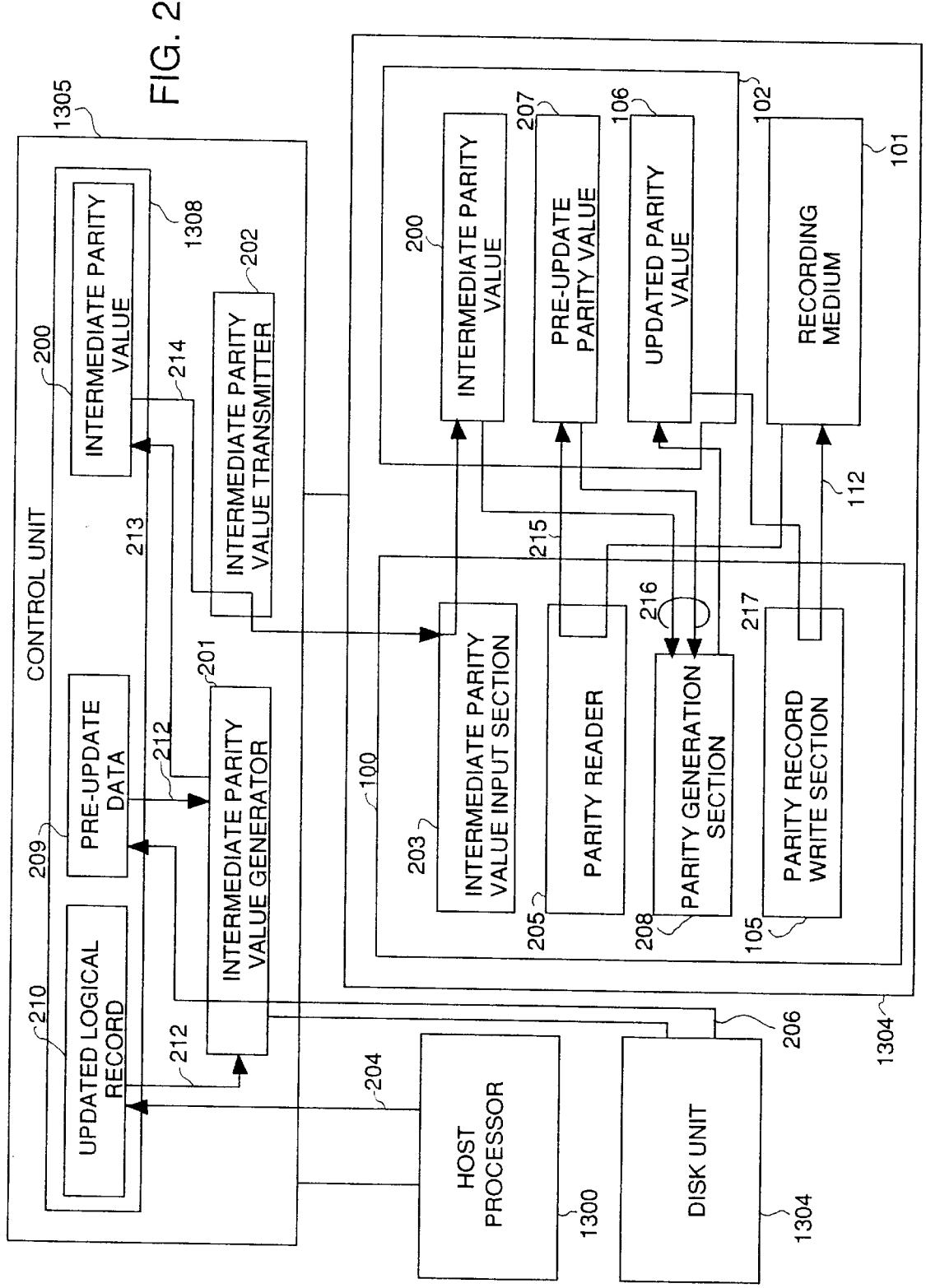
FIG. 2 is a schematic view of a first embodiment of the invention.
Figure 5:
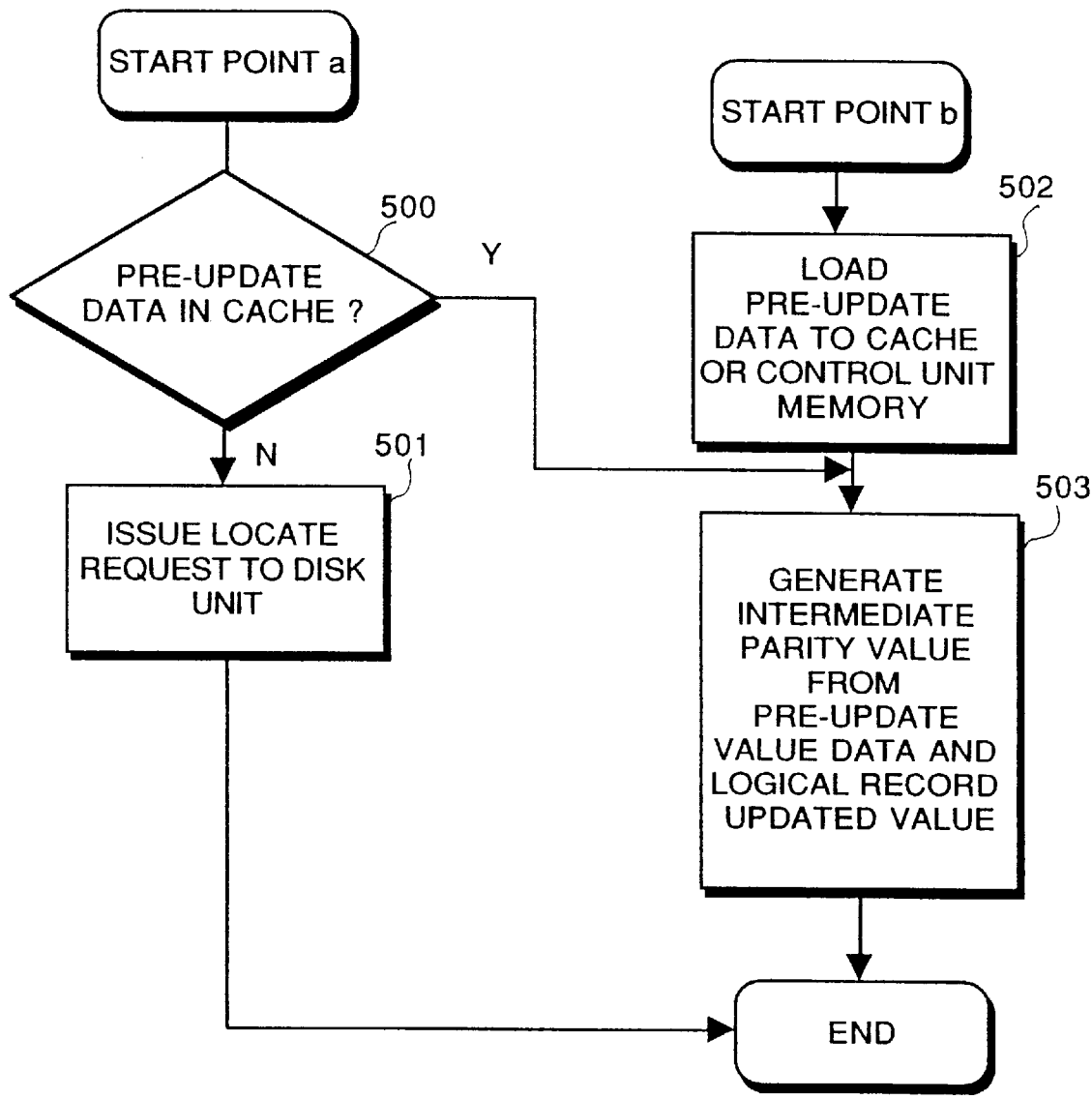
FIG. 5 is a flowchart of the operation of an intermediate parity value transmitter.

The processing flow of the intermediate parity value generator 201 indicated in FIG. 2 is shown in FIG. 5. The chart of FIG. 5 has two start points, start point a and start point b. The control unit 1305 first begins the execution from start point a. In step 500 the directory 1309 is checked to learn whether or not pre-update data 209 is stored in the cache 1308. At this time, if the control unit 1305 lacks a cache 1308 but has the control unit memory 1310, step 501 is executed immediately. If pre-update data 209 is present, the procedure jumps to step 503. If not, then in step 501 a positioning request is issued to the disk unit 1304 storing the data record 1500 corresponding to the logical record 1700 to be written, and the procedure is terminated for the time being.

The start point b is the point at which execution is begun after the positioning operation with respect to the disk unit 1304 has been completed. In step 502, the control unit 1305 loads the pre-update data 209 from the disk units 1304 to the cache 1308 or the control unit memory 1310. When it is loaded in the cache 1308, the content of the directory 1309 is updated.

In step 503, the control unit 1305 generates the intermediate parity value 200 from the updated value of the logical record 1700 stored in the cache 1308 or the control unit buffer 1310 and the pre-update data 209 and stores it in the cache 1308 or the control unit buffer 1310.

Figure 30:
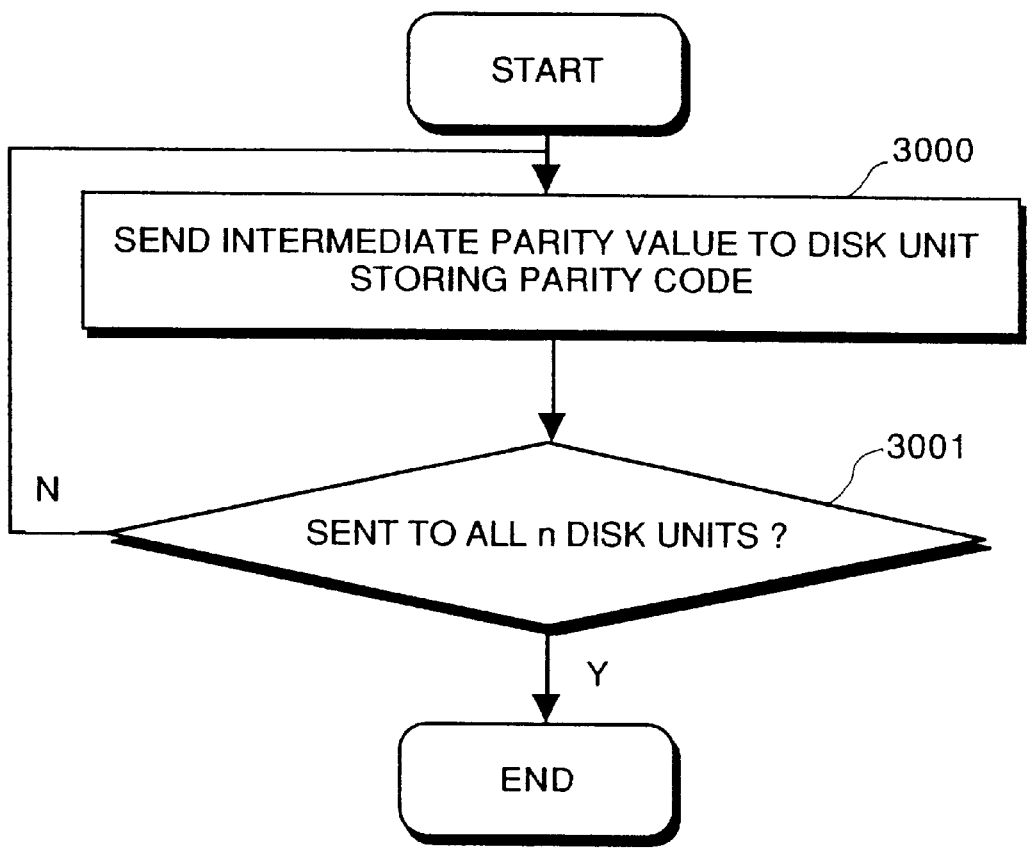
FIG. 30 is a flowchart of an operation of an intermediate parity value transmitter.

FIG. 30 shows the processing flow of the intermediate parity value transmitter 202. In step 3000, the control unit 1305 sends the intermediate parity value 200 to one of the disk units among the n number of disk units in which the parity record is to be updated to which the intermediate parity value 200 has not yet been sent. In step 3001, a check is made as to whether the intermediate parity value 200 has been sent to all n number of disks. If the result of the check is affirmative, the procedure is terminated and if it is not the procedure returns to step 3000.

The process flow of the processing sections on the side of the disk unit 1304 shown in FIG. 2 will now be explained.

Figure 6:
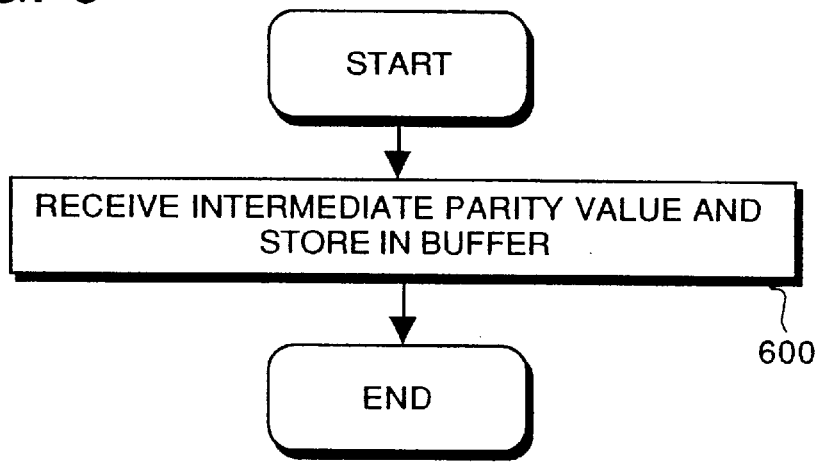
FIG. 6 is a flowchart of the operation of an intermediate parity value input section.

First the processing flow of the intermediate parity value input section 203 will be explained with reference to FIG. 6. In step 600, the processor 100 stores the intermediate parity value 200 received from the control unit 1305 in the buffer 102. When the intermediate parity value 200 is stored in the buffer 102, the buffer management information 107 is updated accordingly.

Figure 7:
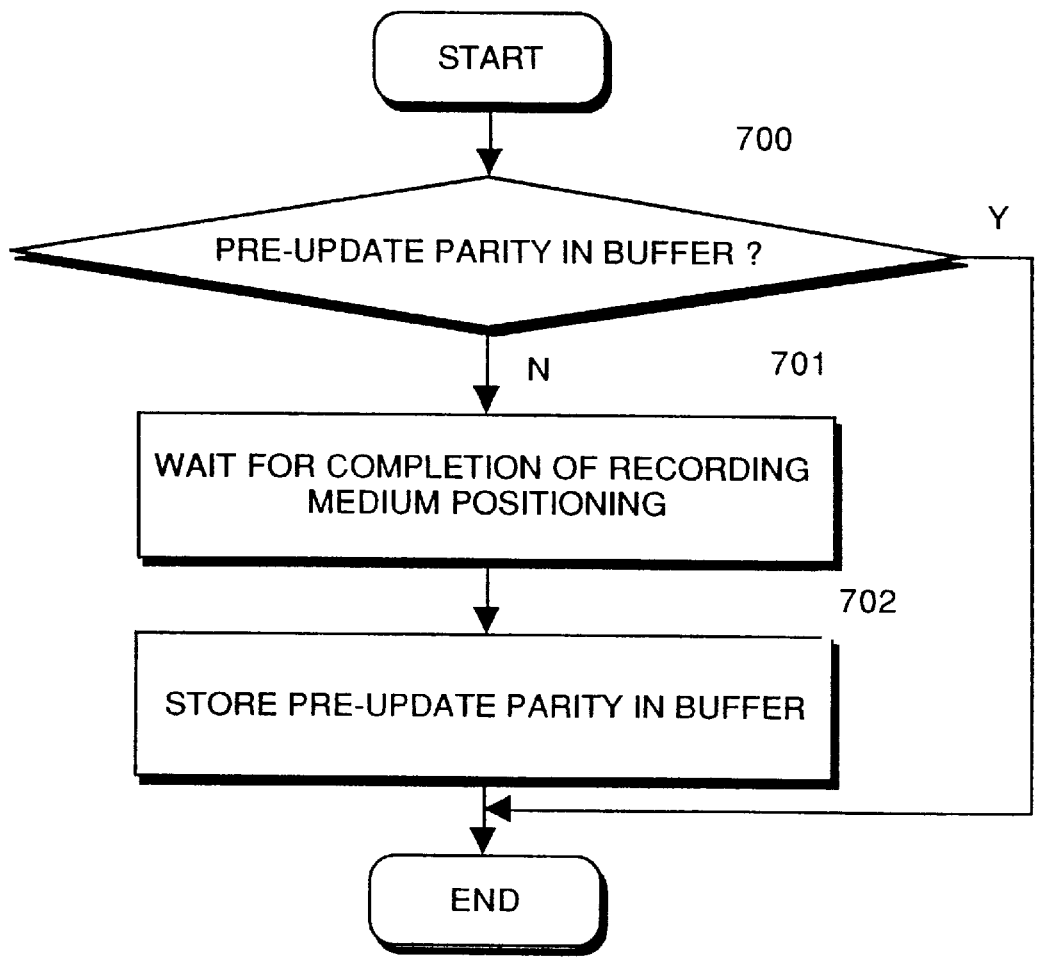
FIG. 7 is a flowchart of the operation of a parity reader.

Next, the processing flow of the parity reader 205 will be explained with reference to FIG. 7. First, in step 700, the processor 100 accesses the buffer management information 107 to check whether the pre-update parity 207 is present in the buffer 102. If it is, the procedure is terminated, and if it is not, step 701 is executed. If the capacity of the buffer 102 is small and the presence of the pre-update parity 207 is unlikely, step 701 can be executed immediately. In step 701, the processor 100 waits for the positioning of the recording medium 101 to be completed. When the positioning has been completed, the processor 100 in step 702 stores the pre-update parity 207 in the buffer 102. At the time of the storage of the pre-update parity 207 in the buffer 102, the buffer management information 107 is updated accordingly. The procedure is then terminated.

Figure 8:
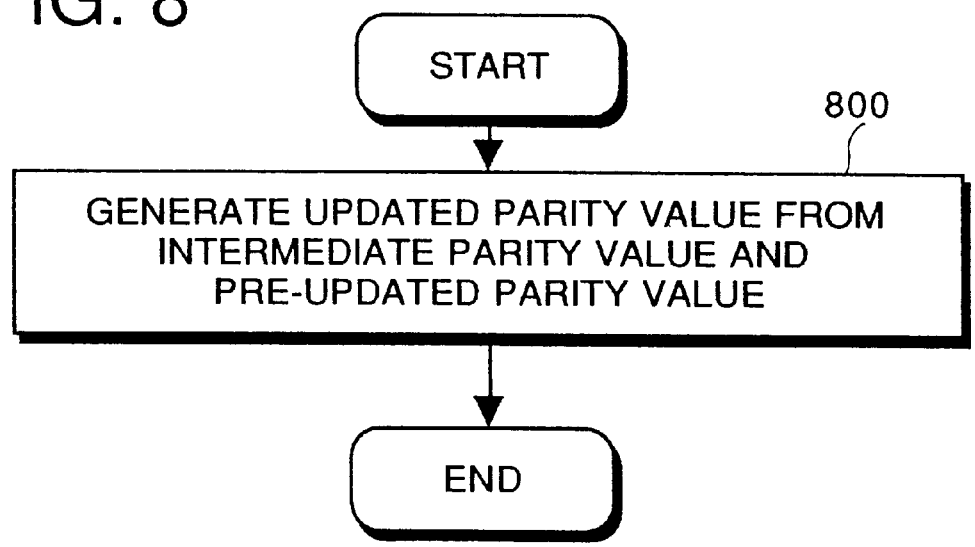
FIG. 8 is a flowchart of an operation of a parity generation section.

FIG. 8 shows the processing flow of the parity generation section a 208. In step 800, the processor 100 generates the updated parity value 106 from the intermediate parity value 200 and the pre-update parity 207 and stores it in the buffer 102. At the time of the storage of the updated parity value 106 in the buffer 102, the buffer management information 107 is updated accordingly. The procedure is then terminated.

Figure 9:
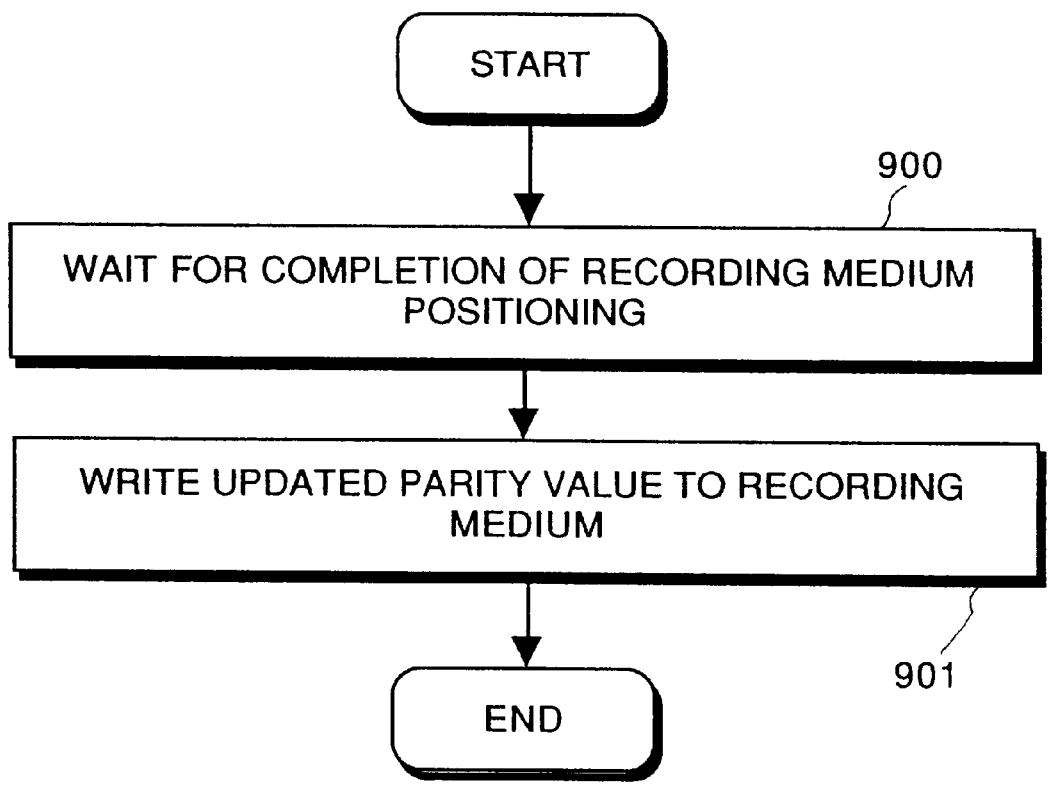
FIG. 9 is a flowchart of an operation of a parity record write section.

FIG. 9 shows the processing flow of the parity record write section 105. First, in step 900, the processor 100 waits for the positioning of the recording medium 101 to be completed. When the positioning has been completed, the processor 100 in step 801 writes the updated value of the parity record 1501 stored in the buffer 102 to the recording medium 101. The procedure is then terminated.

The second embodiment will now be explained in detail.

In the second embodiment, the capability for parity record generation provided in the disk units 1304 is applied to a divided distribution disk array in combination with a capability for broadcast transfer between the control unit 1305 and the disk units 1304. The operations of the control unit 1305 and the processing sections of the data disk unit 301 and the parity disk unit 302 shown in FIG. 3 will now be explained with reference to the processing flow.

FIG. 10 shows the processing flow of the logical record write section 300 shown within the control unit 1305 in FIG. 3. This processing can be executed synchronously with a write request for updating the logical record 1700 received from the processor 1300 or can be executed asynchronously therewith after returning a write request completion report. In either case, the control unit 1305 in step 1000 broadcasts the logical record 1700 received from the processor 1300 to all of the m+n number of disk units 1304 belonging to the parity group 1600, as it is without division.

The processing sections of the data disk unit 301 will be explained.

Figure 11:
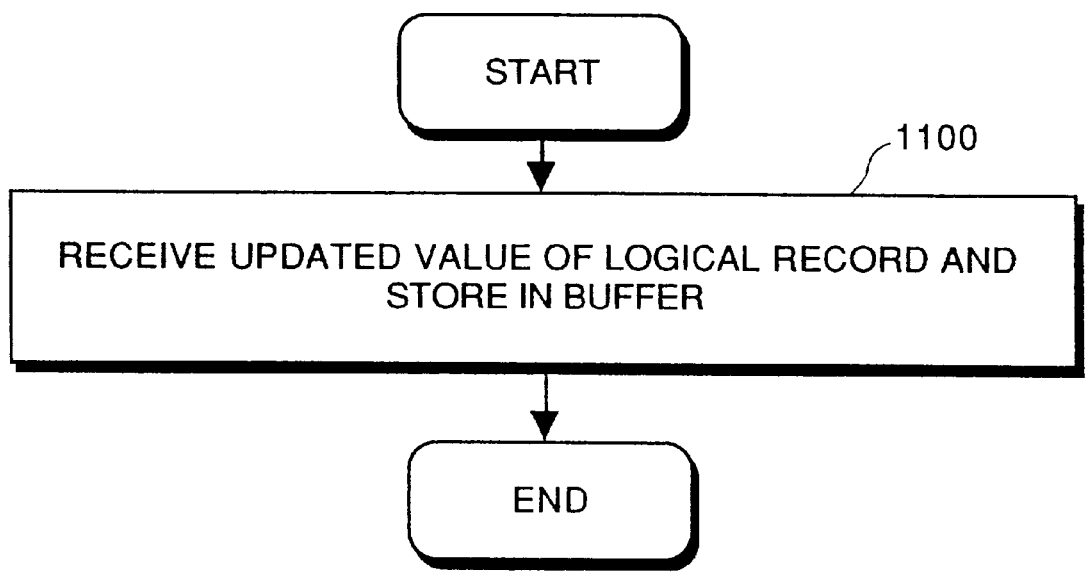
FIG. 11 is a flowchart of an operation of a logical record input section.

FIG. 11 shows the processing flow of the logical record input section 306. In step 1100, the processor 100 stores the logical record 1700 received from the control unit 1305 in the buffer 102. When the logical record 1700 is stored in the buffer 102, the buffer management information 107 is updated accordingly. The procedure is then terminated.

FIG. 12 shows the processing flow of data record write section a 303. First, in step 1200, the processor 100 waits for the positioning of the recording medium 101 to be completed. When the positioning has been completed, the processor 100 in step 1201 extracts from the logical record 1700 the part that is to be written to its own unit and writes the updated value of the parity record 1501 stored in the buffer 102 to the recording medium 101. The procedure is then terminated.

Lastly, the processing sections of the parity disk unit 302 will be explained.

The processing flow of the logical record input section 306 will not be explained since it is the same as that in the case of the data disk unit 301.

Figure 19:
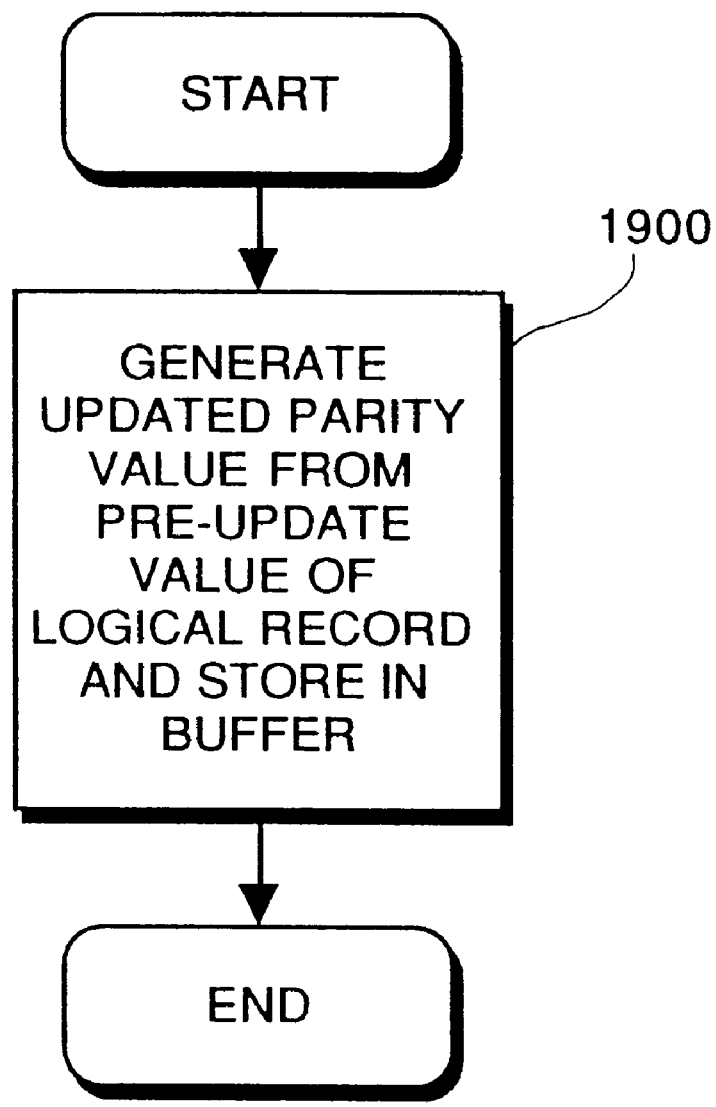
FIG. 19 is a flowchart of an operation of a parity generation section.

FIG. 19 shows the processing flow of the parity generation section b 305 shown in FIG. 3. In step 1900, the processor 100 generates the updated parity value 106 that is to be written to its own unit from the logical record 1700 and stores it in the buffer 102. When the updated parity value 106 is stored in the buffer 102, the buffer management information 107 is updated accordingly. The procedure is then terminated.

The processing flow of the parity record write section 105 will not be explained since it is the same as that in the first embodiment.

Lastly, the third embodiment will be explained in detail.

In the third embodiment, the capability for parity record generation provided in the disk units 1304 is applied to an undivided distribution disk array in combination with a capability for broadcast transfer between the control unit 1305 and the disk units 1304. The operations of the control unit 1305 and the processing sections of the data disk unit 301 and the parity disk unit 302 shown in FIG. 4 will now be explained with reference to the processing flow. The processing flow of the logical record write section 300 in the control unit 1305 will not be explained, however, since it is the same as that in the second embodiment.

The processing sections of the parity disk unit 302 will be explained first. The processing flow of the logical record input section 306 will not be explained, however, since it is the same as that in the second embodiment.

Figure 20:
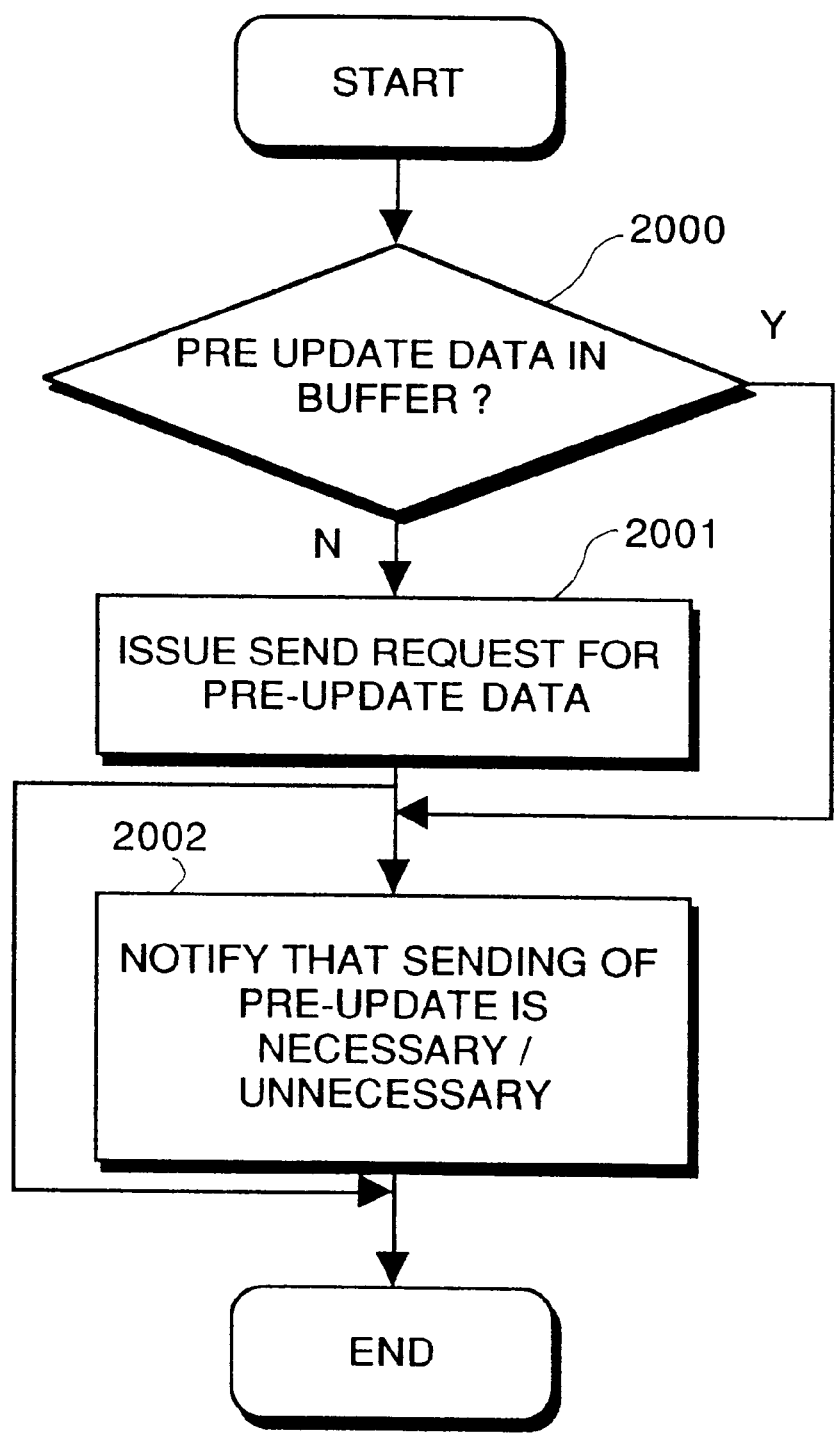
FIG. 20 is a flowchart of an operation of a data record input section.
Figure 21:
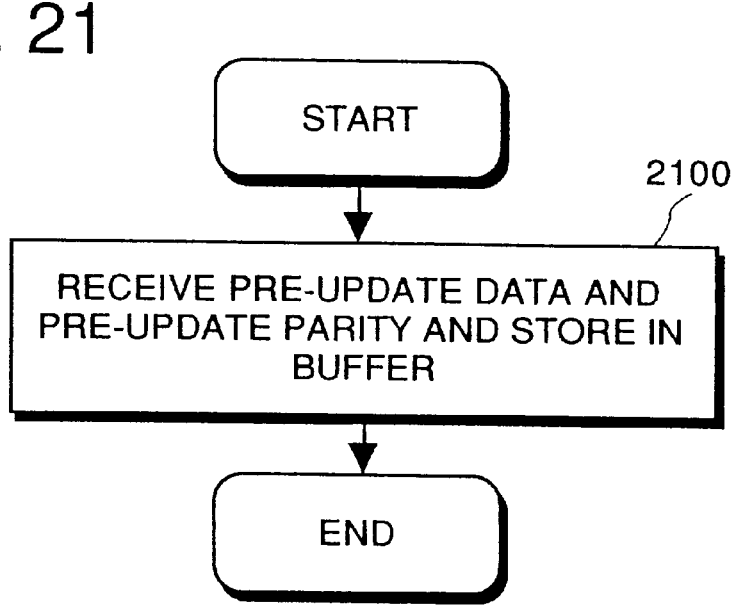
FIG. 21 is a flowchart of an operation of a data record input section.

FIGS. 20 and 21 show the processing flow of the data record receiving section a 402. The processor 100 begins the execution from the processing flow of FIG. 20. In step 2000, the processor 100 accesses the buffer 102 to check whether the pre-update data 209, which is the pre-update value of the data record 1500, is present in the buffer management information 107. If it is not, in step 2001 a send request for the pre-update data 209 is issued to the data disk unit 301 storing the pre-update data 209. The procedure is then terminated for the time being. If the capacity of the buffer 102 is small and the presence of the pre-update data 209 is unlikely, step 2001 can be executed immediately. If it is present, in step 2001 the processor 100 notifies the data disk unit 301 storing the pre-update data 209 that there is no need to send the same after the execution of step 2001. Thereafter, the processor begins the execution of the parity reader 205.

FIG. 21 shows the processing flow of the processing started at the time the pre-update data 209 arrives from the data disk unit 301 storing the same. In step 2100, the processor 100 stores the pre-update data 209 in the buffer 102. When the pre-update data 209 is stored in the buffer 102, the buffer management information 107 is updated accordingly. The procedure is then terminated.

The processing flow of the parity reader 205 will not be explained since it is the same as that in the first embodiment.

Figure 22:
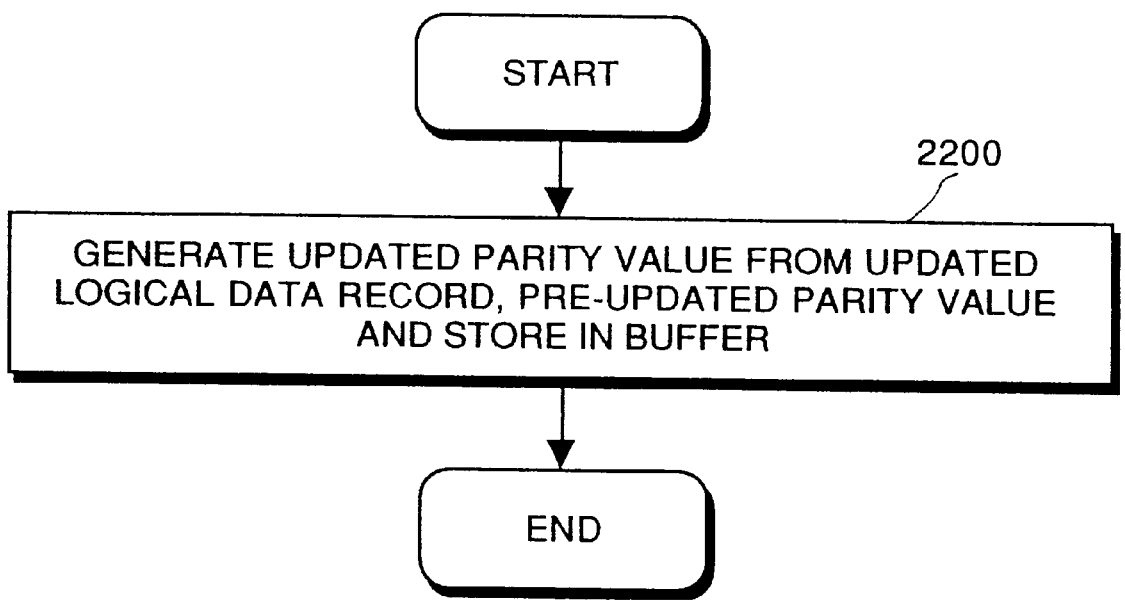
FIG. 22 is a flowchart of an operation of a parity generation section.

FIG. 22 shows the processing flow of the parity generation section c 400. In step 2200, the processor 100 generates the updated parity value 106 from the updated logical record value 210, the pre-update data 209 and the pre-update parity 207 and stores it in the buffer 102. When the updated parity value 106 is stored in the buffer 102, the buffer management information 107 is updated accordingly. The procedure is then terminated.

The processing flow of the parity record write section 105 will not be explained since it is the same as that in the first embodiment.

The processing sections of the data disk unit 301 will be explained next. The processing flow of the logical record input section 306 will not be explained, however, since it is the same as that in the second embodiment.

Figure 23:
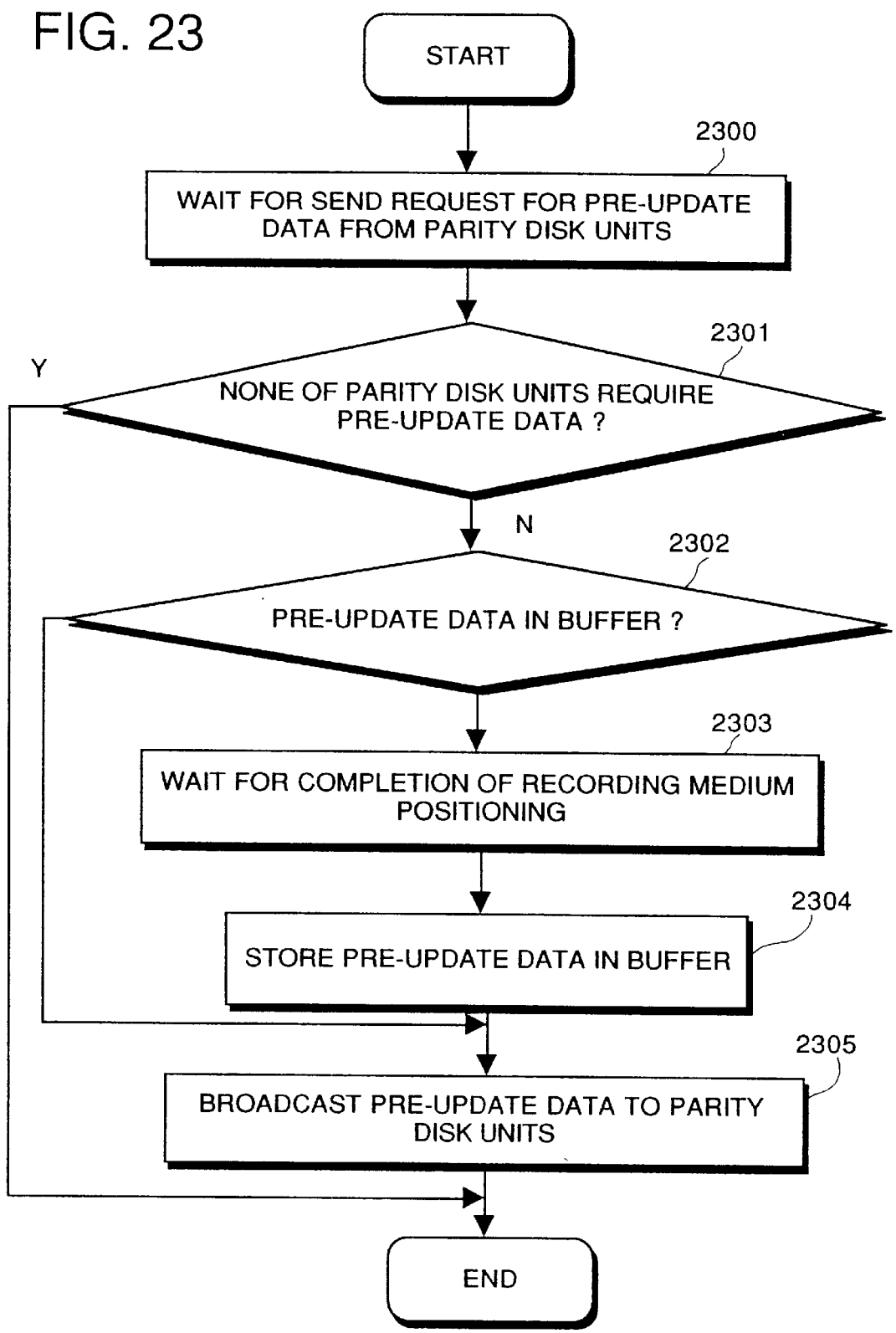
FIG. 23 is a flowchart of an operation of a data record transmitter.

FIG. 23 shows the processing flow of a data record transmitter a 403. In step 2300, the processor 100 waits for a send request for the pre-update data 209 from the n number of parity disk units 302. When a request arrives from the n number of parity disk units 302, the processor 100 in step 2301 checks whether none of the n number of parity disk units 302 require sending of the pre-update data 209. In none do, the procedure is terminated. If at least one of the parity disk units 302 requires sending of the pre-update data 209, the processor 100 in step 2302 accesses the buffer management information 107 to check whether the pre-update data 209 is present in the buffer 102. If it is, the procedure jumps to step 2305. If the capacity of the buffer 102 is small and the presence of the pre-update data 209 is unlikely, it is possible to skip step 2302 and immediately execute step 2303. If it is not present, the processor 100 waits for the positioning of the recording medium 101 to be completed. When the positioning has been completed, the processor 100 stores the pre-update data 209 in the buffer 102 in step 2304. When the pre-update date 209 is stored in the buffer 102, the buffer management information 107 is updated accordingly.

In step 2305, the processor 100 broadcasts the pre-update data 209 to those parity disk units 302 among the n number of parity disk units 302 which require pre-update data 209. The procedure is then terminated. In step 2305, it is also possible to send the pre-update data 209 to all of the parity disk units 302 and have the parity disk units 302 where the pre-update data 209 is already present discard the pre-update data 209 that is sent to them.

Figure 24:
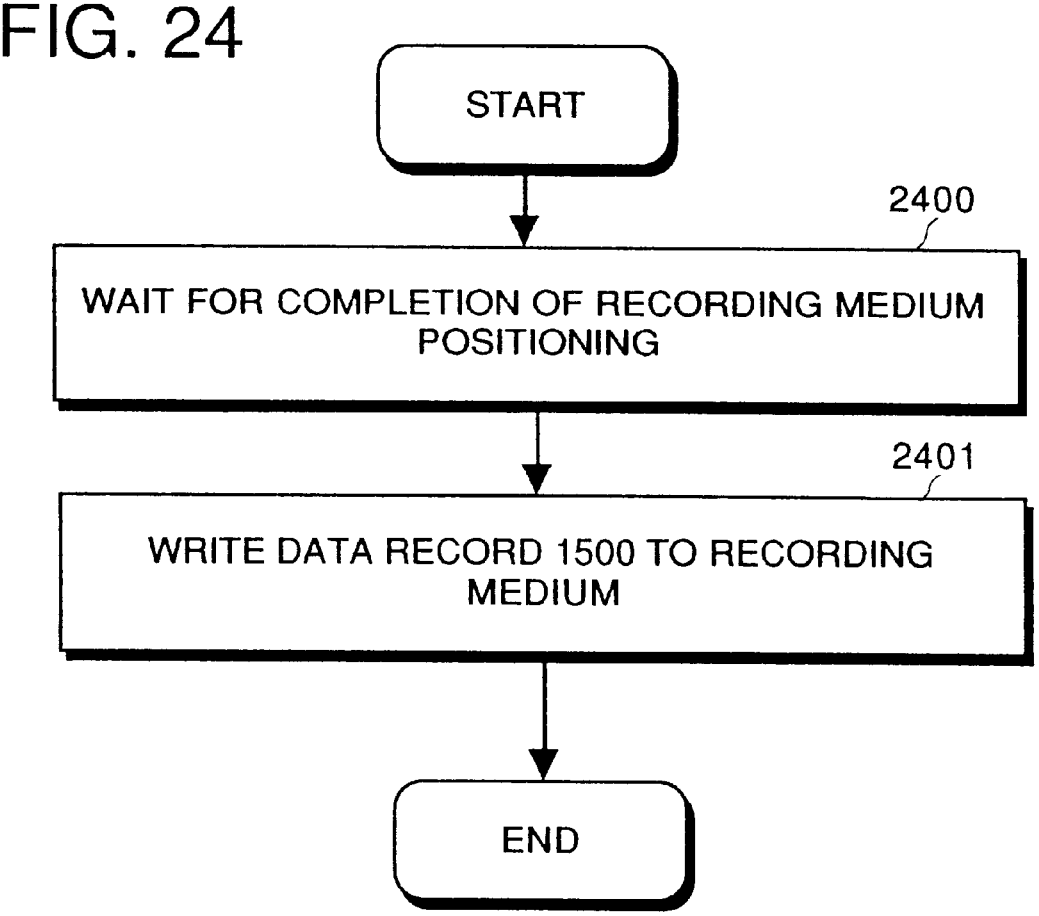
FIG. 24 is a flowchart of an operation of a data record write section.

FIG. 24 shows the processing flow of the data record write section b 401. First, in step 2400, the processor 100 waits for the positioning of the recording medium 101 to be completed. When the positioning has been completed, the processor 100 in step 2401 writes the logical record 1700 received from the control unit 1305 to the recording medium 101 as the data record 1500. The processor is then terminated.

As the m–1 number of disk units that need do nothing require no particular explanation, none will be given.

In the third embodiment, the data transferred between the control unit 1305 and the disk units 1304 include, at most, the updated value of the logical record 1700 and the pre-update data 209. However, as will be understood from step 2000, the pre-update data 209 does not have to be transferred using the data transfer path between the control unit 1305 and the disk units 1304 insofar as the pre-update data 209 is present in the buffer 102 in the parity disk unit 302. More often than not, the logical record 1700 is read by the processor 1300 immediately before it is written thereby. At the time the data disk unit 301 sends the logical record 1700 (=data record 1500) to the control unit 1305 in response to a read request received from the processor 1300, therefore, it is advantageous to simultaneously broadcast it to all the parity disk units 302. This is because doing so enables an increase in the probability of the pre-update data 209 being present in the buffers 102 of the parity disk units 302 at the time the logical record 1700 is to be written. Alternatively, instead of indiscriminately broadcasting the pre-update data 209, it is possible to broadcast the logical record 1700 to the parity disk units 302 only when information has been received from the processor 1300 via the control unit 1305 that there is a high probability of the logical record 1700 which was read owing to the read request later being written.

FIG. 25 illustrates the operation by which the data disk unit 301 broadcasts the logical record 1700 (=data record 1500) to the parity disk units 302 at the same time as sending it to the control unit 1305.

Upon receiving a send request for the data record 1500 from the control unit 1305, a data record transmitter b 2500 of the data disk unit 301 broadcasts (2503) the logical record 1700 (=data record 1500) to the parity disk units 302 as well as the control unit 1305. However, it is not necessary for the data record transmitter b 2500 to execute this broadcast every time it receives a send request for the logical record 1700 and it suffices for it to do so only when it is notified by the control unit 1305 that there is a high probability the logical record 1700 concerned will be written.

A logical record read section 2501 in the control unit 1305 sends the logical record 1700 (=record 1500) sent to it by the data disk unit 301 to the host processor 1300 (not shown).

A disk record input section b 2502 in the parity disk unit 302 stores the logical record 1700 (=data record 1500) sent to it in the buffer 102 as the pre-update data 209.

The individual sections will now be explained in detail with reference to the processing flow.

FIG. 26 shows the processing flow of the data record transmitter b 2500 in the data disk unit 301. In step 2600, the processor 100 accesses the buffer management information 107 to check whether the pre-update data 209 is present in the buffer 102. If it is, the procedure jumps to step 2603. If the capacity of the buffer 102 is small and the presence of the pre-update data 209 is unlikely, it is possible to execute step 2603 immediately. If it is not present, the processor 100 waits for the positioning of the record medium 101 to be completed in step 2601. When the positioning has been completed, the processor 100 stores the pre-update data 209 in the buffer 102 in step 2602. When the pre-update data 209 is stored in the buffer 102, the buffer management information 107 is updated accordingly.

In step 2603, the processor 100 broadcasts the pre-update data 209 to the control unit 1305 and the n number of parity disk units 302. The procedure is then terminated.

FIG. 27 shows the processing flow of the logical record read section 2501. First, in step 2700, the control unit 1305 sends the logical record 1700 (=data record 1500) sent to it from the data disk unit 301 to the host processor 1300. It is possible to store the logical record 1700 thus received in the cache 1308. If it is stored in the cache 1308, the directory 1309 is updated accordingly.

FIG. 29 shows the processing flow of a disk record input section b 2502 in the parity disk unit 302. In step 2900, the processor 100 stores the received logical record 1700 (=data record 1500) in the buffer 102 as the pre-update data 209. At the time of the storage of the pre-update data 209 in the buffer 102, the buffer management information 107 is updated accordingly. The procedure is then terminated.

When a disk array is used, a change in the content of a logical record 1700 makes it necessary to rewrite the content of the parity record 1501. As a result, transfer operations arise on the data transfer path between the control unit and the disk units not only for the updated value of the logical record 1700 to be written but also for providing the information required for generating the updated value of the parity record 1501 and for writing of the parity record 1501. By providing the disk units 1304 with parity record generation capability, this invention makes it possible to suppress the transfer overhead occurring on the data transfer path between the control unit 1308 and the disk unit 1304 as a result of parity record handling.

We claim:

1. An array disk storage system connected to a host processor, comprising:

a first storage unit having a data record storing data used by the host processor;

a second storage unit having a parity record corresponding to said data record of said first storage unit for storing parity data for recovering the data of said data record;

a control unit connected to said first and second storage units having a cache memory and receiving update data for said data record specified by a write request from a host processor, said control unit storing said update data into the cache memory, sending said update data in said cache memory to said first storage unit to write said update data into said data record, and then said control unit sending intermediate data generated from said update data and from pre-update data of said data record to said second storage unit; and said second storage unit generating updated parity data from said intermediate data and pre-update parity data of the parity record in accordance with an instruction issued by said control unit, and writing the updated parity data into the parity record.

2. An array disk storage system having a plurality of storage units for storing plural parity groups connected to a host processor, comprising:

m (m≧1) first storage units, each having a data record storing data used by the host processor;

a second storage unit other than said first storage units having a parity record corresponding to said data records of said first storage units, wherein m data records of said m first storage units and said corresponding parity record constitute a parity group; and a control unit connected to said first storage units and said second storage unit, said control unit having a cache memory and receiving update data for said data records specified by a write request from said host processor, storing said update data into the cache memory, sending said update data to said m first storage units to write said update data into each of said data records of said parity group, and then said control unit sending intermediate data generated from said update data and from pre-update data of said data records of said parity group to said second storage unit;

said second storage unit generating update parity data from said intermediate data and pre-update parity data of said parity group in accordance with an instruction issued by said control unit, and writing the updated parity data into the parity record of said second storage unit.

3. An array disk storage system connected to a host processor, comprising:

a first storage unit having a data record storing data used by the host processor;

a second storage unit having a parity record corresponding to said data record of said first storage unit for storing parity data for recovering the data of said data record; and a control unit connected to said first and second storage units having a cache memory and receiving update data for said data record specified by a write request from a host processor, said control unit reporting a completion of said write request to said host processor after storing said update data into the cache memory, reading pre-update data of said data record in said first storage unit, thereafter sending said update data in said cache memory to said first storage unit to write said update data into said data record, said control unit generating intermediate data from said update data and said pre-update data, and then sending said intermediate data to said second storage unit;

said second storage unit generating updated parity data from said intermediate data and pre-update parity data of the parity record in accordance with an instruction issued by said control unit, and writing the updated parity data into the parity record.

* * * * *